US011532018B2

(12) United States Patent
Box et al.

(10) Patent No.: US 11,532,018 B2
(45) Date of Patent: *Dec. 20, 2022

(54) TARGETED MARKETING BASED ON SOCIAL MEDIA INTERACTION

(71) Applicant: rewardstyle, Inc., Dallas, TX (US)

(72) Inventors: Baxter Box, Dallas, TX (US); Harrison Jackson, Dallas, TX (US)

(73) Assignee: rewardStyle, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/647,104

(22) Filed: Jan. 5, 2022

(65) Prior Publication Data

US 2022/0129951 A1 Apr. 28, 2022

Related U.S. Application Data

(63) Continuation of application No. 17/205,772, filed on Mar. 18, 2021, now Pat. No. 11,250,473, which is a
(Continued)

(51) Int. Cl.
*G06Q 30/02* (2012.01)
*G06Q 50/00* (2012.01)

(52) U.S. Cl.
CPC ..... *G06Q 30/0269* (2013.01); *G06Q 30/0251* (2013.01); *G06Q 30/0261* (2013.01); *G06Q 50/01* (2013.01)

(58) Field of Classification Search
CPC . G06Q 50/01; G06Q 30/0269; G06Q 30/0251
See application file for complete search history.

(56) References Cited

U.S. PATENT DOCUMENTS

| 5,812,769 A | 9/1998 | Graber et al. |
| 6,029,141 A | 2/2000 | Bezos et al. |
(Continued)

FOREIGN PATENT DOCUMENTS

| CN | 107004206 A | 8/2017 |
| CN | 108604234 A | 9/2018 |
(Continued)

OTHER PUBLICATIONS

International Preliminary Report on Patentability issued by the USPTO dated Mar. 17, 2016 for International Application No. PCT/US2015/019212.
(Continued)

*Primary Examiner* — Waseem Ashraf
*Assistant Examiner* — Robert C Johnson
(74) *Attorney, Agent, or Firm* — Bookoff McAndrews, PLLC

(57) ABSTRACT

A system and method for providing targeted marketing to a user based on the user's social media interaction. The system includes one or more computing platforms providing computer-automated functionality performing method steps for accepting a digital media and digital media related data from a publisher, generating associated information unique identifiers, monitoring social media networks for member-user rankings of the digital media after it is posted, and communicating to a member-user targeted marketing information based on the user rankings A data storage device persists the digital media, digital media related data, and information unique identifier, which may include a linking hash character, a unique identifier, an account identifier, and/or social media network system-defined elements. The publisher selects digital media and information representing digital media elements, and posts the digital media on the social
(Continued)

media network website. Edits, if applied to the selected digital media, are persisted in the data storage.

20 Claims, 16 Drawing Sheets

Related U.S. Application Data continuation of application No. 15/876,684, filed on Jan. 22, 2018, now Pat. No. 10,984,453, which is a continuation of application No. 14/254,050, filed on Apr. 16, 2014, now Pat. No. 9,875,488, which is a continuation-in-part of application No. 13/905,926, filed on May 30, 2013, now Pat. No. 10,535,080, which is a continuation-in-part of application No. 13/838,578, filed on Mar. 15, 2013, now Pat. No. 10,475,084, which is a continuation-in-part of application No. 13/731,383, filed on Dec. 31, 2012, now Pat. No. 9,779,425, which is a continuation-in-part of application No. 13/547,771, filed on Jul. 12, 2012, now Pat. No. 11,010,795.

(60) Provisional application No. 61/617,857, filed on Mar. 30, 2012.

(56) References Cited

U.S. PATENT DOCUMENTS

| | | | |
|---|---|---|---|
| 6,141,666 A | 10/2000 | Tobin | |
| 6,334,111 B1 | 12/2001 | Carrott | |
| 6,477,504 B1 | 11/2002 | Hamlin et al. | |
| 6,615,238 B1 | 9/2003 | Melet et al. | |
| 6,629,135 B1 | 9/2003 | Ross, Jr. et al. | |
| 7,032,168 B1 | 4/2006 | Gerace et al. | |
| 7,359,869 B1 | 4/2008 | Ananda | |
| 7,480,627 B1 | 1/2009 | Van Horn et al. | |
| 7,617,122 B2 | 11/2009 | Kumar et al. | |
| 8,285,598 B2 | 10/2012 | Mesaros | |
| 8,775,611 B1 | 7/2014 | Deshpande | |
| 9,100,205 B1 | 8/2015 | Deshpande | |
| 9,495,693 B2 | 11/2016 | Box et al. | |
| 9,779,425 B2 | 10/2017 | Stoliartchouk et al. | |
| 9,871,757 B1* | 1/2018 | Reardon | H04L 51/52 |
| 9,875,488 B2 | 1/2018 | Box et al. | |
| 11,157,944 B2* | 10/2021 | Roullier | H04L 9/0894 |
| 2002/0184095 A1 | 12/2002 | Scullard et al. | |
| 2004/0044565 A1 | 3/2004 | Kumar et al. | |
| 2004/0199762 A1 | 10/2004 | Carlson et al. | |
| 2005/0065806 A1 | 3/2005 | Harik | |
| 2006/0112081 A1 | 5/2006 | Qureshi | |
| 2007/0043583 A1* | 2/2007 | Davulcu | G06F 16/951 |
| | | | 705/347 |
| 2007/0061229 A1 | 3/2007 | Ramer | |
| 2007/0061242 A1 | 3/2007 | Ramer | |
| 2007/0088713 A1 | 4/2007 | Baxter et al. | |
| 2007/0106666 A1* | 5/2007 | Beckerle | G06F 16/27 |
| 2007/0121843 A1* | 5/2007 | Atazky | G06Q 50/01 |
| | | | 379/114.13 |
| 2007/0214097 A1 | 9/2007 | Parsons | |
| 2007/0288312 A1 | 12/2007 | Wang | |
| 2008/0065476 A1 | 3/2008 | Klein et al. | |
| 2008/0077574 A1 | 3/2008 | Gross | |
| 2008/0126515 A1 | 5/2008 | Chambers et al. | |
| 2008/0133365 A1 | 6/2008 | Sprecher et al. | |
| 2008/0208682 A1 | 8/2008 | Chandley et al. | |
| 2009/0018917 A1 | 1/2009 | Chapman et al. | |
| 2009/0070219 A1 | 3/2009 | D'Angelo | |
| 2009/0106098 A1 | 4/2009 | Getz | |
| 2009/0254838 A1 | 10/2009 | Rao et al. | |
| 2009/0281893 A1 | 11/2009 | Muhonen et al. | |
| 2010/0010887 A1 | 1/2010 | Karlin et al. | |
| 2010/0058160 A1 | 3/2010 | Navarro et al. | |
| 2010/0082360 A1 | 4/2010 | Chien et al. | |
| 2010/0293157 A1 | 11/2010 | Ito | |
| 2011/0082730 A1 | 4/2011 | Karlin et al. | |
| 2011/0106628 A1 | 5/2011 | Nam et al. | |
| 2011/0161680 A1* | 6/2011 | Grube | H04L 9/3236 |
| | | | 713/193 |
| 2011/0258050 A1* | 10/2011 | Chan | G06Q 30/02 |
| | | | 705/14.66 |
| 2011/0302025 A1 | 12/2011 | Hsiao | |
| 2012/0005024 A1 | 1/2012 | Gutierrez | |
| 2012/0054143 A1 | 3/2012 | Doig | |
| 2012/0215773 A1 | 8/2012 | Si | |
| 2012/0245976 A1 | 9/2012 | Kumar et al. | |
| 2012/0253918 A1 | 10/2012 | Marois et al. | |
| 2012/0265806 A1* | 10/2012 | Blanchflower | H04L 51/52 |
| | | | 709/204 |
| 2012/0323666 A1 | 12/2012 | King | |
| 2012/0324002 A1* | 12/2012 | Chen | G06F 16/51 |
| | | | 709/204 |
| 2013/0055101 A1* | 2/2013 | Sabur | G06Q 10/10 |
| | | | 715/739 |
| 2013/0073632 A1 | 3/2013 | Fedorov | |
| 2013/0132194 A1 | 5/2013 | Rajaram | |
| 2013/0151416 A1 | 6/2013 | Ng et al. | |
| 2013/0204701 A1 | 8/2013 | Calafiore et al. | |
| 2013/0262971 A1 | 10/2013 | Stoliartchouk et al. | |
| 2013/0268367 A1 | 10/2013 | Erdogan | |
| 2013/0282455 A1* | 10/2013 | Houseworth | G06Q 50/01 |
| | | | 705/14.16 |
| 2014/0019248 A1 | 1/2014 | Stoliartchouk et al. | |
| 2014/0019267 A1 | 1/2014 | Stoliartchouk et al. | |
| 2015/0081562 A1* | 3/2015 | Roullier | H04L 9/0894 |
| | | | 705/50 |
| 2015/0082050 A1* | 3/2015 | Roullier | G06F 21/6254 |
| | | | 713/189 |
| 2017/0017648 A1 | 1/2017 | Peariman et al. | |
| 2017/0052983 A1 | 2/2017 | Pearlman et al. | |
| 2018/0167474 A1 | 6/2018 | Box | |
| 2018/0247319 A1 | 8/2018 | Voder | |

FOREIGN PATENT DOCUMENTS

| | | | | |
|---|---|---|---|---|
| WO | 2007/021974 | 2/2007 | | |
| WO | 2007/092358 | 8/2007 | | |
| WO | 2008/002335 | 1/2008 | | |
| WO | 2009/006606 | 1/2009 | | |
| WO | 2009/045405 | 4/2009 | | |
| WO | 2009/126941 | 10/2009 | | |
| WO | 2010/090783 | 8/2010 | | |
| WO | 2011/121455 | 10/2011 | | |
| WO | 2013/148356 | 10/2013 | | |
| WO | 2013/150479 | 10/2013 | | |
| WO | WO-2014130484 A1 * | 8/2014 | | G06F 16/22 |
| WO | 2015/160444 | 10/2015 | | |
| WO | 2017/011742 | 1/2017 | | |

OTHER PUBLICATIONS https://web.archive.org/web/20100929103739/http://sazze.com/info?show=faq, Sep. 29, 2010.
https://web.archive.org/web/20101220115405/http://sazze.com/products/nintendo-wii-remote-controller, Dec. 20, 2010.
https://web.archive.org/web/20100929070944/http://sazze.com/info?show=privacy, Sep. 29, 2010.
https://web.archive.org/web/20101213190848/http://sazze.com/reviews?, Dec. 13, 2010.
International Search Report and Written Opinion dated Oct. 1, 2013 by the United States Patent and Trademark Office for International Application No. PCT/US2013/034151, 11 pages.
Communication dated Feb. 9, 2017 issued by the European Patent Office for co-pending European Patent Application No. 13717619.4, 6 pages.
Reply in Response to the Communication dated Feb. 9, 2017 as filed with the European Patent Office on May 15, 2017 for co-pending European Patent Application No. 13717619.4, 23 pages.

(56) References Cited

OTHER PUBLICATIONS

Reply in Response to the Communication dated Dec. 2, 2016 as filed with the European Patent Office on Jun. 8, 2017 for co-pending European Patent Application No. 15713,059.2, 21 pages.
Reply in Response to the Communication dated Mar. 8, 2016 as filed with the European Patent Office on Sep. 16, 2016 for co-pending European Patent Application No. 13717619.4, 16 pages.
Supplemental Search Report issued by the European Patent Office dated Mar. 8, 2016 for co-pending European Patent Application No. 13717619.4, 1 page.
Communication dated Feb. 18, 2016 issued by the European Patent Office for co-pending European Patent Application No. 13717619.4, 11 pages.
International Search Report and Written Opinion dated May 19, 2015 by the European Patent Office for International Application No. PCT/US2015/019212, 8 pages.
International Search Report and Written Opinion dated Jul. 10, 2015 by the European Patent Office for International Application No. PCT/US2015/019212, 9 pages.

\* cited by examiner

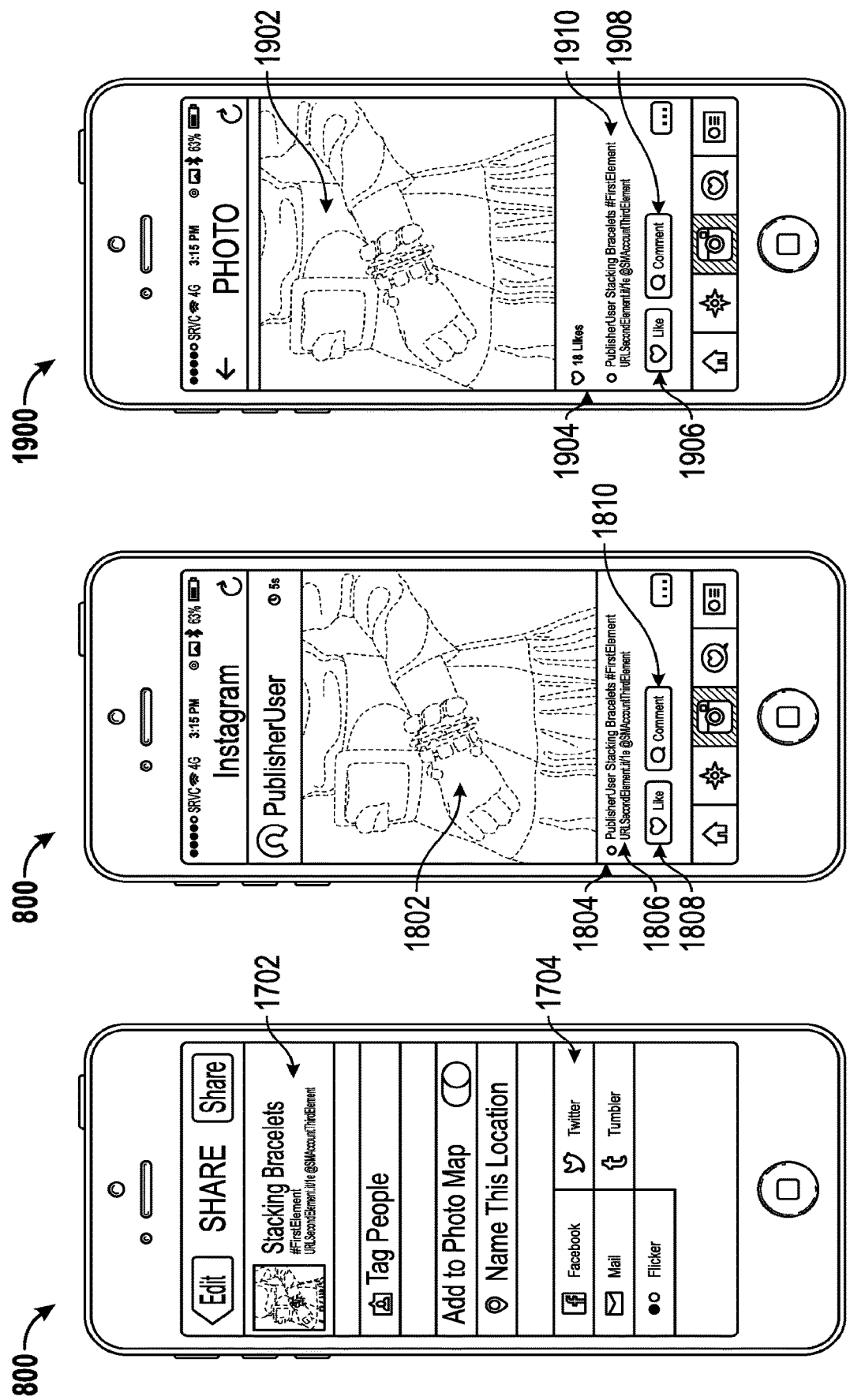

TARGETED MARKETING BASED ON SOCIAL MEDIA INTERACTION

CROSS-REFERENCE TO RELATED APPLICATIONS

This application is a continuation of and claims the benefit of priority to U.S. patent application Ser. No. 17/205,772, filed Mar. 18, 2021, which is a continuation of and claims the benefit of priority to U.S. patent application Ser. No. 15/876,684, filed Jan. 22, 2018, now U.S. Pat. No. 10,984,453, issued on Apr. 20, 2021, which is a continuation of and claims the benefit of priority to U.S. patent application Ser. No. 14/254,050, filed Apr. 16, 2014, now U.S. Pat. No. 9,875,488, issued on Jan. 23, 2018, which is a continuation-in-part of and claims the benefit of priority to U.S. patent application Ser. No. 13/905,926, filed on May 30, 2013, now U.S. Pat. No. 10,535,080, issued on Jan. 14, 2020, which is a continuation-in-part of and claims the benefit of priority to U.S. patent application No. 13/838,578, filed on Mar. 15, 2013, now U.S. Pat. No. 10,475,084, issued on Nov. 12, 2019, which is a continuation-in-part of and claims the benefit of priority to U.S. patent application Ser. No. 13/731,383, filed on Dec. 31, 2012, now U.S. Pat. No. 9,779,425, issued on Oct. 3, 2017, which is a continuation-in-part of and claims the benefit of priority to U.S. patent application No. 13/547,771, filed on Jul. 12, 2012, which claims the benefit of U.S. Provisional Patent Application Ser. No. 61/617,857, filed on Mar. 30, 2012, all of which are incorporated herein by reference in their entireties.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates generally to online product advertising and social networking and, more specifically, to a system and method for providing automated targeted online marketing based on a consumer's social media interactions.

2. Description of Related Art Including Information Disclosed Under 37 CFR 1.97 and 1.98

Businesses create marketing campaign advertisements to market products to various consumer demographics in the hopes of convincing some percentage of the consumers to purchase particular products. However, such mass advertisements are costly and relatively ineffective unless interested potential consumers receive information regarding the goods or services in which they are interested. Given the finite budgets involved, it is usually the job function of marketing personnel to obtain sufficient data to assist them in their determination as to which consumers to target with the advertisement.

It is commonly understood in business advertising that if it is possible to accurately determine a potential consumer's desire for or interest in a particular product and provide that consumer with the relevant information regarding that particular product when the desire or interest is greatest, then the chance of the consumer acting on this desire or interest and making the purchase is much greater than if the information is not received, is incorrect, or arrives at a time when interest is low or non-existent. The more certain the desire or interest can be determined, then the higher the probability of a completed sale. Such an advertising technique is known as targeted marketing, which requires adequate essentially real-time consumer information to realize. Thus, actively monitoring a potential consumer's actions, desires, and interests as they occur and develop would be an ideal way of achieving such information, but such effective data gathering is effectively non-existent despite current technology advances.

With the rapid evolution of technology there has been a growing trend toward online publishing by individuals through social media. Popular social media networking websites, for example, Instagram, Facebook, Twitter, Pinterest, Google+, Tumblr, YouTube, Vine, and Flicker allow users to post user-generated or acquired images and comments effectively at will. And, because camera-enabled smartphones are ubiquitous, it is relatively simple for social media users to take and post digital photographs and video on these websites and to include commentary. Once posted, subscribers or "friends" of the individual's posts are allowed to comment on the posts or otherwise rank such posts to indicate the level of "like" that they share. Such information—ranking by these subscribers or "friends" of particular posts—is invaluable in determining what the subscriber or "friend" is not only interested in, but also when such interest is effectively the greatest. However, efficient access to this information does not exist in current online systems and applications.

One highly relevant exemplar of use of social media networks involves publishers in the fashion industry, who often share images of favorite clothing, shoe, and/or accessory fashion items. Such fashion publishers enjoy sharing clothing and accessory "finds" with others through these social media network websites. Upon posting of, for example, a particularly attractive combination of clothing and accessories, subscribers to the publisher's posts receive notification of such posts and will browse and rank the posted image. Thus, the subscriber personally records his or her current like or dislike of the clothing and accessories. Near real time access to this data would allow marketers of the particular clothing and accessories to present timely relevant advertisements to the subscriber, but such efficiency has not been possible prior the present invention. It is a goal of the present invention to obtain timely information about a consumer's preference for a commercial good so that the possibility of consummating a sale is greatly improved for, among other things, achieving a commission on the sale.

BRIEF SUMMARY OF THE INVENTION

Described and claimed herein is a system for providing targeted marketing based on social media interaction, the system comprising: a computer automated information unique identifier creation device in network communication with at least one social media network computing device, the information unique identifier creation device adapted to generate an information unique identifier in response to a selected digital media and/or a related textual caption, the social media network computing device adapted to accept the posting of the selected digital media and the generated information unique identifier from a publisher, and to allow a ranking of the posted digital media by a plurality of social media network member users; a computer automated digital media ranking monitor device adapted to monitor the social media network computing device for the posted digital media ranking; and a computer automated communications device adapted to communicate targeted marketing information to the social network member user, the marketing information relevant to the member user's posted digital media ranking Additional embodiments comprising added inventive elements are further described and claimed in the related dependent claim set.

Also described and claimed herein is a method for providing targeted marketing based on social media interaction, the method steps comprising: providing at least one automated computing device in network communication with at least one social media network computing device, the social media network computing device adapted to accept as a post from a publisher user a digital media and a related caption, and to allow a ranking by a plurality of social media network member users of the posted digital media, the automated computing device executing program instructions to perform the method steps comprising: receiving a selected digital media and related data and/or metadata from a publisher; receiving digital media related data from the publisher, the digital media related data representing elements within the selected digital media; saving the selected digital media and storing a reference to the selected digital media and digital media related data and/or metadata in a database device record, and generating a unique character identifier representative of the database record location; generating an information unique identifier in response to the selected digital media and/or related textual caption, the information unique identifier generation steps comprising: associating the information unique identifier with the selected digital media reference and digital media related data; monitoring the social media network computing device for a posted digital media ranking by a social media network users; and communicating periodically to the social media network member user targeted marketing information based upon the posted digital media ranking, the targeted marketing information comprising detailed consumer information related to the posted digital media. Additional embodiments comprising added inventive elements are further described and claimed in the related dependent claim set.

BRIEF DESCRIPTION OF THE SEVERAL VIEWS OF THE DRAWING(S)

The present invention will be more fully understood by reference to the following detailed description of the preferred embodiments of the present invention when read in conjunction with the accompanying drawings, wherein:

FIG. 17 is a depiction of the screen of a publisher user handheld computing device depicting the social media network media sharing screen as provided by the embodiment;

FIG. 18 is a depiction of the screen of a publisher user handheld computing device depicting the social media network publisher shared media as provided by the embodiment;

FIG. 19 is a depiction of the screen of a social media member user handheld computing device depicting the social media network screen for member user review and ranking as provided by the embodiment;

Figure 1:
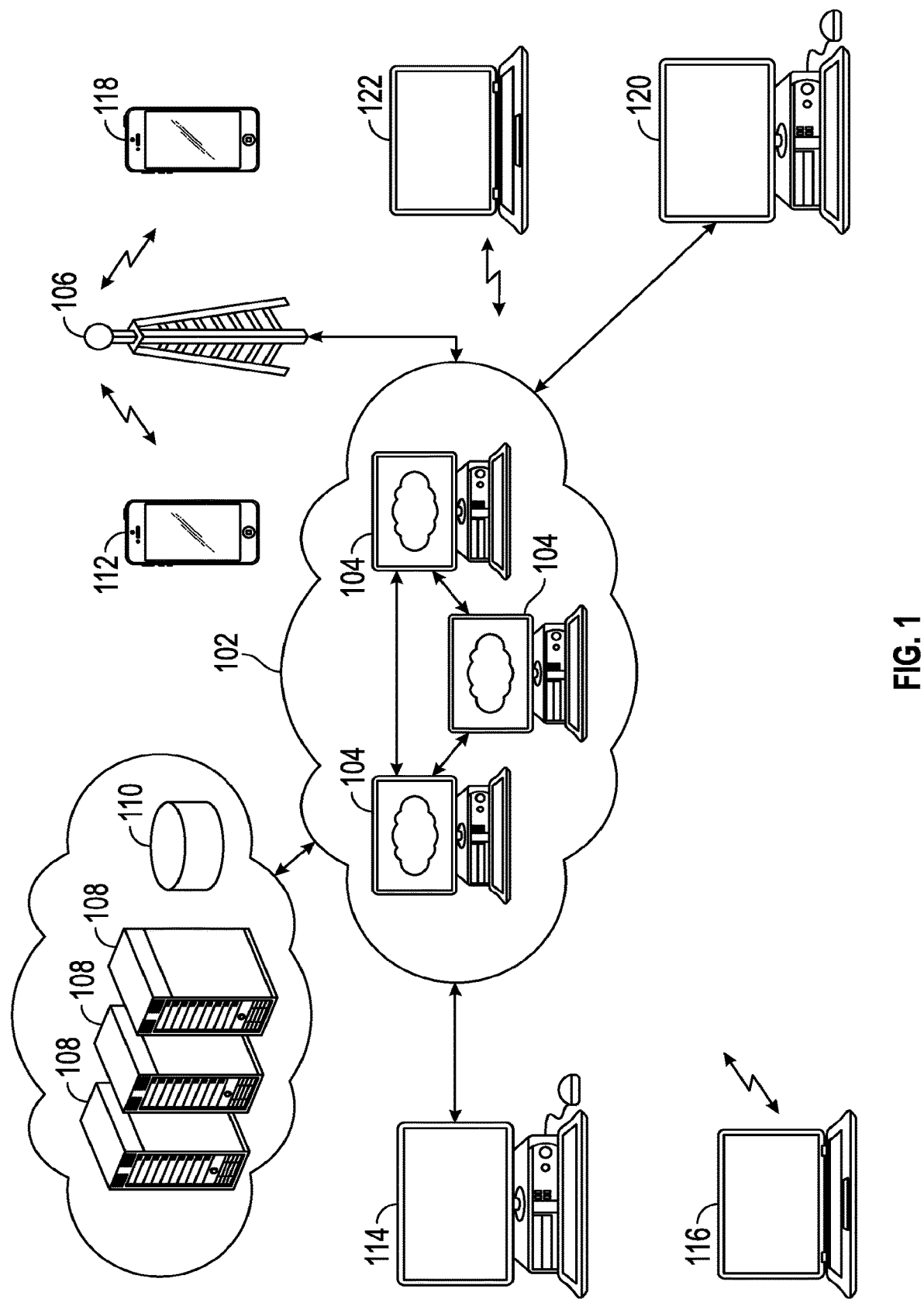
FIG. 1 is a depiction of the overall hardware and network architecture as practiced by a first embodiment of the invention.

The above figures are provided for the purpose of illustration and description only, and are not intended to define the limits of the disclosed invention. Use of the same reference number in multiple figures is intended to designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the particular embodiment. The extension of the figures with respect to number, position, relationship, and dimensions of the parts to form the preferred embodiment will be explained or will be within the skill of the art after the following teachings of the present invention have been read and understood.

DETAILED DESCRIPTION OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

A system and method is described herein for advantageous use of potential consumer information to target specific and relevant advertisements to the potential consumer when the affinity for such information is greatest. The system and method is practiced on one or more networked computing devices. As used herein, the term "automated computing device" or "computing device" or "computing device platform" means a device capable of executing program instructions as streamed or as requested from attached volatile or non-volatile memory. For example, such a device utilizes a microprocessor, microcontroller, or digital signal processor in signal communication with a dedicated and/or shared memory component (RAM, ROM, etc.), one or more network components (NIC, Wi-Fi, Bluetooth, Zigbee, etc.), one or more user input components (keyboard, mouse, touchscreen, etc.), one or more user output or display components, and/or additional peripheral components including a database for bulk data storage. The computing device may also utilize a standard operating system upon which the program instructions may be executed (OS X, iOS, Linux, UNIX, Android, Windows, etc.) or may utilize a proprietary operating system for providing basic input/output. For purposes of illustration but not limitation, examples of a computing device include mainframe computers, workstation computers, database servers, personal computers, laptop computers, notebook computers, tablet computers, smartphones, personal digital assistants (PDAs), or the like, or even some combination thereof As used herein "computer readable medium" means any tangible portable or fixed RAM or ROM device, such as portable flash memory, a CDROM, a DVDROM, embedded RAM or ROM integrated circuit devices, or the like. A "data storage device" or "database device" means a device capable of persistent storage of digital data, for example, a computer database server or other computing device operating a relational database management system (RDBMS), for example, SQL, MySQL, Apache Cassandra, or the like, or even a flat file system as commonly understood.

As used herein, the term "network" or "computer network" means any digital communications network that allows computing devices to exchange data over wired and/or wireless connections, including the telecommunications infrastructure. Such a network also allows for distributed processing, for example, through website and database hosting over multiple computer network connected computing devices. The present invention may utilize one or more such networked computing devices, with each device physically residing in different remote locations, including in the "cloud" (i.e., cloud computing). As used herein, the term "online" means, with respect to a computing device, that the computing device is in computer network communication with one or more additional computing devices. The term "online" means, with respect to a user of a computing device, that the user is utilizing the computing device to access one or more additional computing devices over a computer network.

As used herein, the term "computer network address" or "network address" means the uniform resource identifier (URI) or unique network address by which a networked computer may be accessed by another. The URI may be a uniform resource locator (URL), a uniform resource name (URN), or both, as those terms are commonly understood by one of ordinary skill in the information technology industry.

As used herein, the term "web browser" means any software application for retrieving, presenting, or traversing digital information over a network (e.g., Safari, Firefox, Netscape, Internet Explorer, Chrome, and the like). A web browser accepts as an input a network address, and provides a page display of the information available at that network address. Underlying functionality includes the ability to execute program code, for example, JavaScript or the like, to allow the computing device to interact with a website at a given network address to which the browser has been "pointed."

As used herein, the term "digital media" means any form of electronic media where media data are stored in digital format. This includes, but is not limited to, video, still images, animations, audio, any combination thereof, and the like. The term "rank" or "ranking" of the digital media means the assignment of a value by one viewing the digital media that indicates the one's approval or disapproval, or acceptance, of the digital media. For example, most social media network services allow a user viewing a posted digital media to indicate whether the viewer "likes" the posted digital media by allowing the selection of a "like" button (or other such graphical user input device) associated with the digital media. The social media network service records and persists this "like" ranking in a dedicated database as a use metric, associating the ranking with the posted digital media and attributing the ranking with the member user. Also collected as a metric by social media network services are the digital media views by the member users. Thus, an inference may be made that a user that views a particular digital media without assigning a "like" ranking either does not like the digital media or is ambivalent towards the particular digital media. In addition to or alternatively, social media network services may allow a value ranking by, for example, allowing a member user to assign a multiple star value (e.g., 0 to 5 stars) or a number range (e.g., 0 to 10), with the higher star count or number range indicating a greater or lesser approval or acceptance of the digital media.

The method steps and computing device interaction described herein are achieved through programming of the computing devices using commonly known and understood programming means. For example, stored programs consisting of electronic instructions compiled from high-level and/or low-level software code using industry standard compilers and programming languages, or may be achieved through use of common scripting languages and appropriate interpreters. The method steps operating on user computing devices may utilize any combination of such programming language and scripting language. For example, compiled languages include BASIC, C, C++, C#, Objective-C, .NET, Visual Basic, and the like, while interpreted languages include JavaScript, Perl, PHP, Python, Ruby, VBScript, and the like. For network communications between devices, especially over internet TCP/IP connections, web browser applications and the like may use any suitable combination of programming and scripting languages, and may exchange data using data interchange formats, for example, XML, JSON, SOAP, REST, and the like. One of ordinary skill in the art will understand and appreciate how such programming and scripting languages are utilized with regard to creating software code executable on a computing device platform.

FIG. 1 depicts the overall hardware and network architecture as practiced by a first embodiment of the invention. As shown, the system utilizes a network connection to a computer network (102), which in the present embodiment is a commonly known Internet connection. Also enjoying a network connection to the computer network (102) are one or more social media network services (104). The social media network services include any online social media network service that accepts the posting of digital media, and allows others to browse the posted digital media and to apply a ranking to the browsed posted digital media. Examples of social media network services include, but are not limited to, Instagram, Facebook, Twitter, Pinterest, Google+, Tumblr, YouTube, Vine, and Flicker.

The social media network services utilized by the embodiment also operate upon automated computing devices providing such functionality through execution of stored program software code and afford third-party access to the service through an application programming interface (API). For example, the Instagram API allows registered third-party access to posted digital media, captions and related metadata (including "likes" of the posted digital media), real-time digital media updates, and other data. One of ordinary skill will readily understand how such API calls may be utilized to obtain the desired data, and will be readily capable of incorporating such API calls into proprietary software functions designed for such access. Each of the listed example social media network services affords such an API and access to at least certain of its data and metadata. In addition to commonly known and practiced wired (Ethernet or the like) and/or wireless (Wi-Fi and the like) access to the network (102) also includes cellular networks (106), thereby affording access to the social media networking services using handheld computing device cellular phones (112), tablets (118), and the like.

The system computing devices (108) and data storage devices (110) are connected to the network (102) to access the social media network services (104) using the provided APIs. The system functionality described herein may be provided on one or more computing devices (108), depending on system requirements. For example, system requirement considerations to determine the number and power of computing (108) and data storage (110) hardware utilized include, without limitation, budgetary constraints, number of actual or anticipated users, failover, redundancy for continuity of service, etc., and are within the skill of one of ordinary skill.

The system (108) can be accessed by publisher users using wired desktop or personal computing device (114), wirelessly connected computing device (116), and/or cellular handheld computing device (112) access means, such means operable to provide network access to the system (108) and social media network services (104) through a web browser. In another embodiment a dedicated graphical user interface (GUI) may also be provided. Social media network member users can also access the system (108) through the same wired (120), wireless (122), and/or cellular handheld device (118) access means. Each publisher user and social media network member user computing device is capable of receiving program code over the network (102) connection through the device web browser or as a download from an application service provider or other such service. Such devices are considered peripheral to the system devices (108 and 110).

Figure 2:
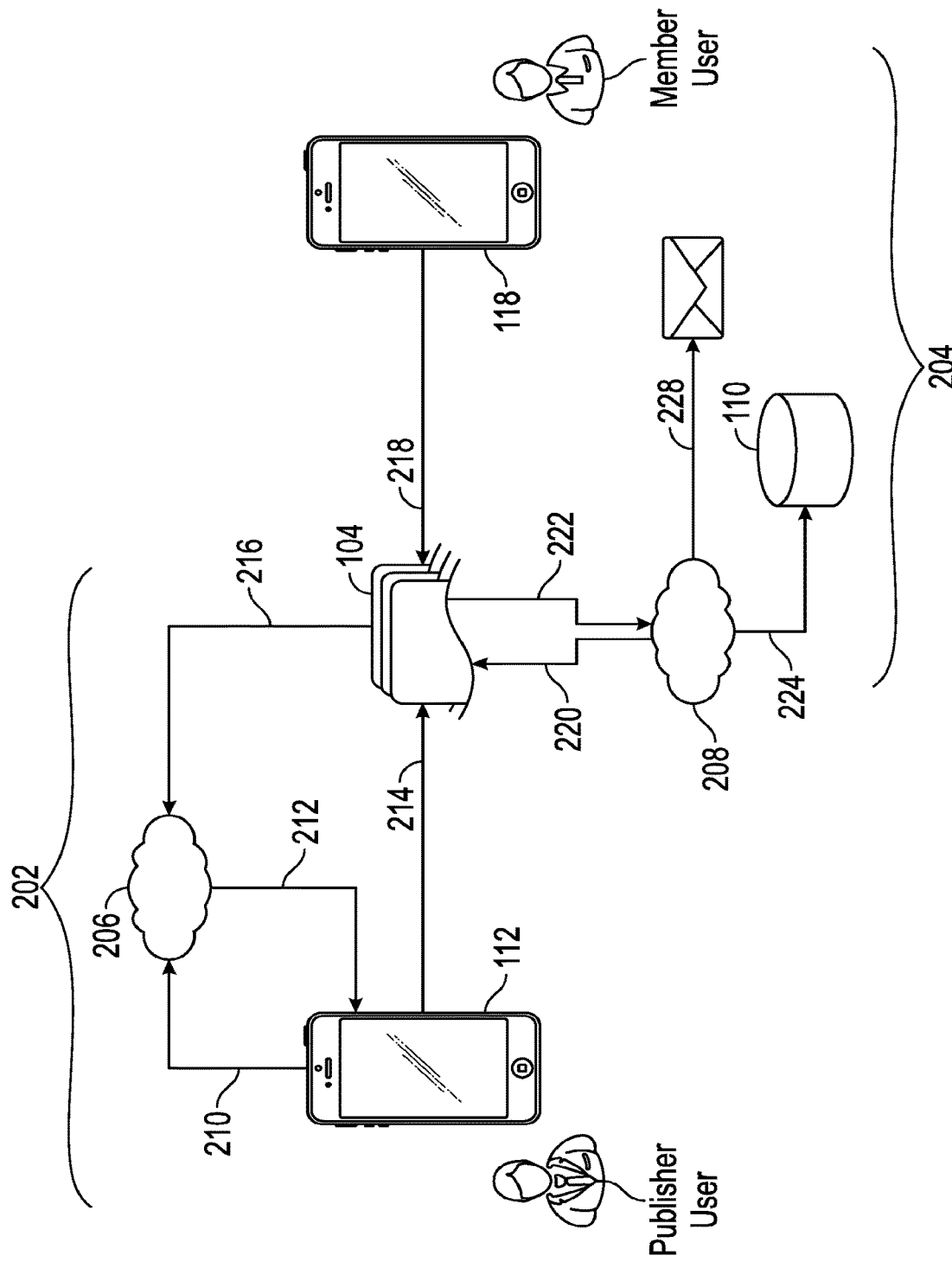
FIG. 2 is a depiction of the overall process flow of the embodiment, highlighting the high-level interaction among the system and peripheral devices.

FIG. 2 is a depiction of the overall process flow of the embodiment, highlighting the high-level interaction among the users, system, and peripheral devices. The diagram is divided to highlight activities related to the information unique identifier creation device (202) processes and the digital media ranking monitor device and communications device (204) processes. The information unique identifier creation device (206), which is in network communication with the social media network service computing device (104), communicates with a publisher user's handheld computing device (112) as previously described, following download of the program code as an application from an application provider (for example, the Apple® App Store) and authentication of the publisher user's social media network service account as described in additional detail below. Using the installed and authenticated application, the publisher user (112) selects a digital media from its device (112) for sharing on the social media network service (104) and provides a caption for same. The selected digital media and caption are shared (210) with the information unique identifier creation device (206) of the system, which generates and returns an information unique identifier in response (212). The publisher user then posts this digital media and related information unique identifier (214) on the social media network service (104) for member users to access and rank. Upon posting, the social media network service (104) notifies the system of the posted image and any modifications thereto (216) for persistent storage of same in the system data storage device.

A member user's handheld computing device (118) that is also registered with the social media network service (104) accesses the posted digital media on the social media network service (104) and provides a "ranking" of the digital media (218). The system digital media ranking monitor device (208) of the system periodically accesses the social media network service (104) to request a report of the digital media rankings (220), which the service (104) subsequently provides (222). This received ranking and digital media information is then persisted in the data storage device (110) for subsequent storage and processing. The communications device (208) of the system periodically sends targeted marketing information to the member user that is relevant to the member user's digital media rankings (228).

Figure 3A:
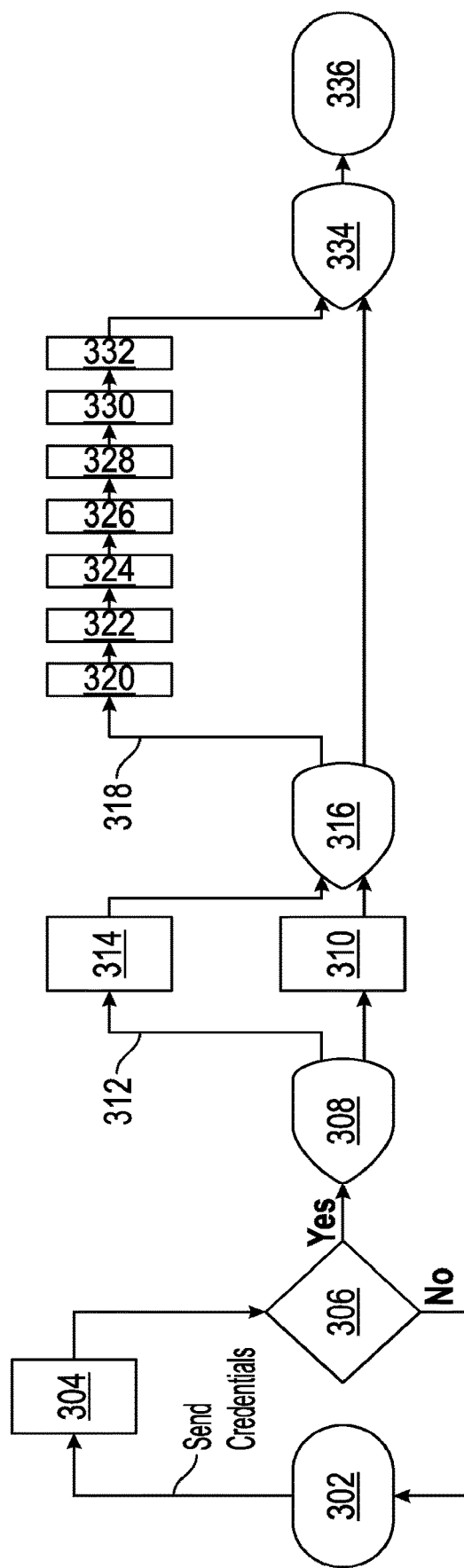
FIG. 3A is a flowchart of the process flow as practiced by the system and a publisher user device.

FIG. 3 is a flowchart of the process flow as practiced by the system and a publisher user device, including steps taken by the user. In particular, the upper flowchart elements of FIG. 3A represent process steps taken by the information unique identifier creation device while the lower flowchart elements represent steps taken by a publisher user device. As previously mentioned, in the present embodiment the publisher user first downloads an application to the publisher user's computing device to provide the following relevant functionality. Once installed on the publisher user's computing device, the publisher user must register and authenticate with the system of the present embodiment. When the application begins execution (302), the system is contacted with the publisher user's credentials and an authorization token is provided (304). If the publisher user is not yet registered with the system (306), the user must register and the authorization process begins anew (302). Once registered, the application screen is presented to the publisher user and the full relevant functionality is provided (308). If the social media network service also requires user registration and authentication, then the publisher user also registers its account with the social media network service.

Using the installed and authenticated application, the publisher user selects a digital media file for posting on the social media network service (310). The selected digital media file in this embodiment is a digital media file that represents certain objects in physical existence. For example, the digital media may be a digital representation of consumer items, such as, an individual wearing a certain brand of clothing and accessories, which makes sense given that the invention pertains to targeted marketing. However, the invention can also apply to targeted marketing of non-consumer information based on a member user's ranking of non-consumer data.

Ancillary to the stated functionality, the system provides a means for organizing and persisting the publisher user's favored consumer items. Such ancillary favoriting and dynamic consumer product web page parsing and specialized product hyperlink generation functionality is described in related United States patent applications represented as patent publication numbers 2013/0262971; 2013/148870; 2014/0019266; 2014/0019267; and 2014/0019248, the disclosures of which are hereby incorporated by reference for all necessary purposes. These applications share common inventorship with the instant application. The publisher user's favored consumer items are maintained in favorites folders on a database device, and comprise specialized hyperlinks and other metadata relevant to the favored consumer items including from where such consumer items may be obtained. The specialized hyperlinks also provide a means for crediting the publisher user in the event that another user follows the hyperlink to make a purchase of the related consumer item, and are detailed in the above applications that are incorporated by reference.

Figure 3B:
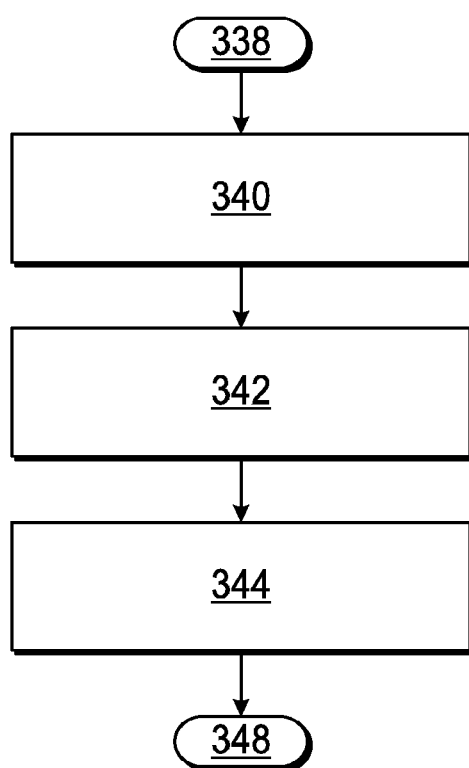
FIG. 3B is a depiction of program steps taken by the system embodiment to assist with dynamic location of consumer products.

Upon selection of a digital media file the application then requests from the system the publisher user's favorites folders (312), the contents of which are returned to the publisher user's application interface (314). The publisher user is then allowed to select favored consumer items from the favorites folder relevant to the items present (or visible) in the digital media so that this additional, related item data and metadata may accompany the selected digital media (316). In another embodiment, if the publisher user's favorites folder does not contain a favored consumer item that is considered relevant to the items present in the digital media, the publisher user is allowed to conduct a text or image search for the aforementioned specialized hyperlinks and other metadata relevant to the present consumer item, utilizing the systems and methods disclosed in the applications that are incorporated by reference above. Thus, consumer items relevant to the items present in the digital media may be located dynamically. FIG. 3B depicts program steps taken by the system embodiment to assist with dynamic location of consumer products (338).

The publisher user is first presented with an application browser that allows the user to locate a consumer product advertiser's website, from which the publisher user may select a consumer item relevant to the items present in the previously chosen digital media (340). The system then dynamically parses the consumer product webpage using XML or text parsing scripts as required to obtain the consumer product data, from which the specialized product hyperlink is generated (342). This consumer product data and specialized hyperlink data are then added to the publisher user's favorites folder for future use (344). This consumer product and hyperlink data may they be selected by the publisher user as additional digital media data for the selected digital media (348).

Referring once more to FIG. 3A, following selection, the digital media and additional digital media related data are posted to the system (318). The system information unique identifier creation device then saves the posted digital media to a data storage device (320) and creates and stores a reference to the digital media database record (322). The digital media related data is then stored in the database device as well (324), and a new database record (and record ID) is created for use with the information unique identifier (326). The digital media related data database record ID is then provided to the information unique identifier creation device (328) and a hash value that represents and is related to the information bundle database record is generated (330). In this embodiment the hash value is created by encoding the record ID into Base62 (letters A-Z, a-z, and numbers 0-9) using standard encoding techniques. Other embodiments may utilize a different number base, for example, Base32 or Base64. The information unique identifier link is then created and returned to the publisher user (332).

An example of an embodiment of an information unique identifier is as follows:

FirstElement URLSecondElement @SMAccountThirdElement

The "#FirstElement" represents a social media network hash tag that provides a means to link all of the various information unique identifiers together on the social media network service. This element affords the ability to search the social media network service for the #FirstElement to view all posts with that hash tag. This hash tag may be any combination of characters. The "URLSecondElement" represents a shortened or full-length hyperlink, the selection of which returns for display all stored information for the digital image from the system database device records. In the present embodiment the system uses Base62 decoding to obtain a unique identifier value. In alternate embodiments the system utilizes the unique URL of the social media network service or a Media ID provided by the social media network service API as the unique identifier instead of using a system provided unique identifier. The "@SMAccountThirdElement" represents the name of the social media network service account that is controlled by the system and not the publisher, and serves as a master account handle. This master account affords the embodied system access to the social media network service via the API. The use of this account handle with publisher posts affords the ability to reach the master account profile page on the social media network service. From this master account profile page a social media network member user may access featured publisher posts, or may even register with the system embodiment as a publisher user. The "URLSecondElement" is a required element and may, in other embodiments, be utilized without the # FirstElement and @SMAccountThirdElement. In another embodiment the information unique identifier comprises only the URLSecondElement while in another embodiment the information unique identifier comprises the URLSecondElement and either of # FirstElement or @SMAccountThirdElement, and/or may include additional system defined elements.

Following creation of the information unique identifier, the publisher user is presented with a pre-publish screen to preview the digital media and information bundle package for posting on the social media network service (334). The publisher user computing device interface then transitions the publisher user to the social media network service interface (336) to allow posting of the digital media package.

Figure 4:
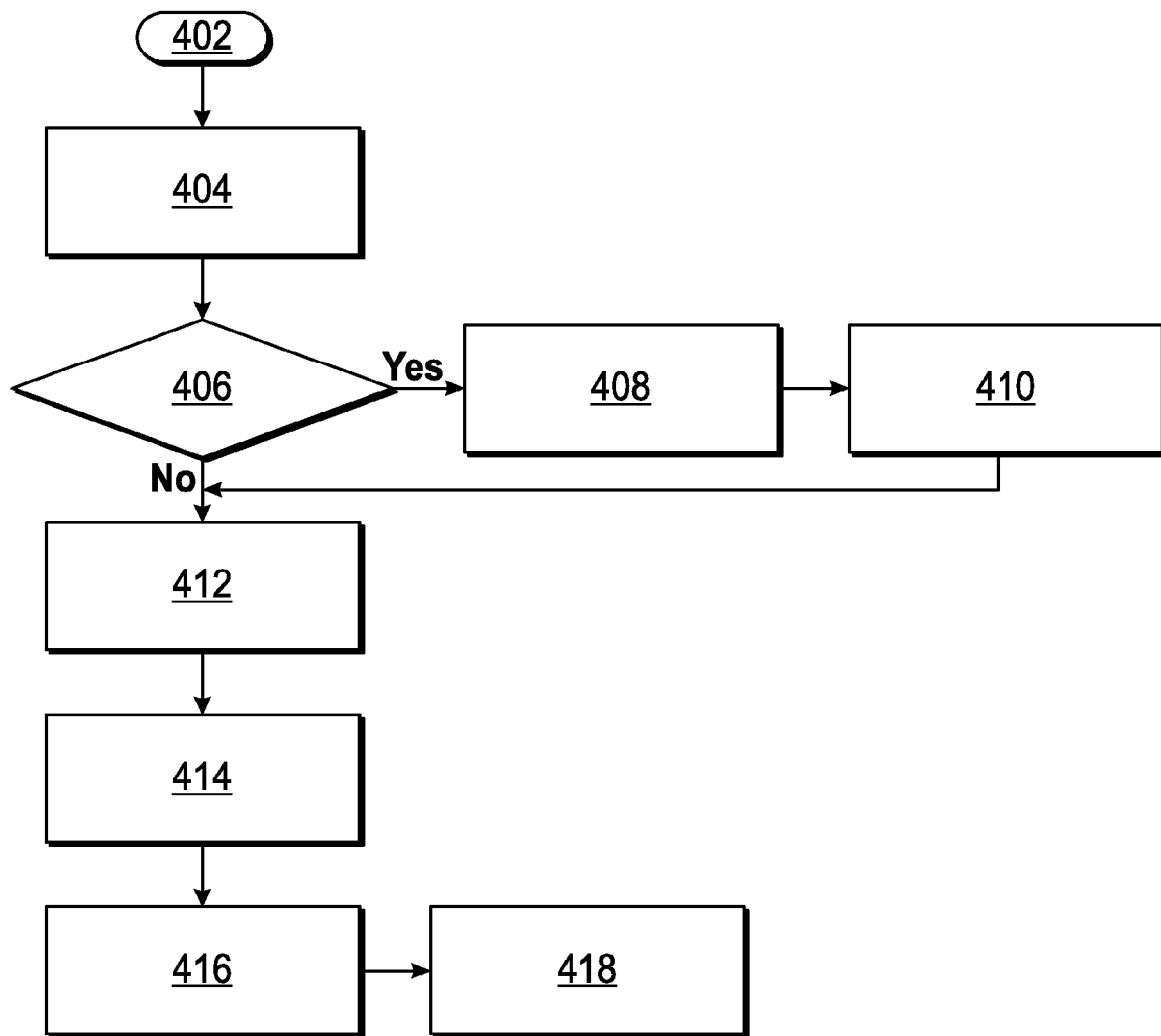
FIG. 4 is a flowchart of major portions of the process flow as performed by a publisher user upon posting a digital media on a social media networking service in the present embodiment.

FIG. 4 is a flowchart of major portions of the process flow as performed by a publisher user upon posting a digital media on a social media networking service in the present embodiment. Upon entering the social media network service interface (402) the publisher user is presented with options regarding image filters (404). If the publisher user chooses to modify the original digital media with a filter (406), then a copy of the digital media is created (408), the filters applied to modify the copy (410), and the digital media package is posted on the social media network website (412). Once posted, the information bundle in the digital media package causes the social media network service to generate a callback to the system regarding the posting (414) and the posted digital media file is saved and the information bundle is activated on the system (418). If filters were applied to the digital media prior to posting, then the modified digital media file is provided to the system where it is saved in the database device in relation to the original digital media file (416).

Figure 5:
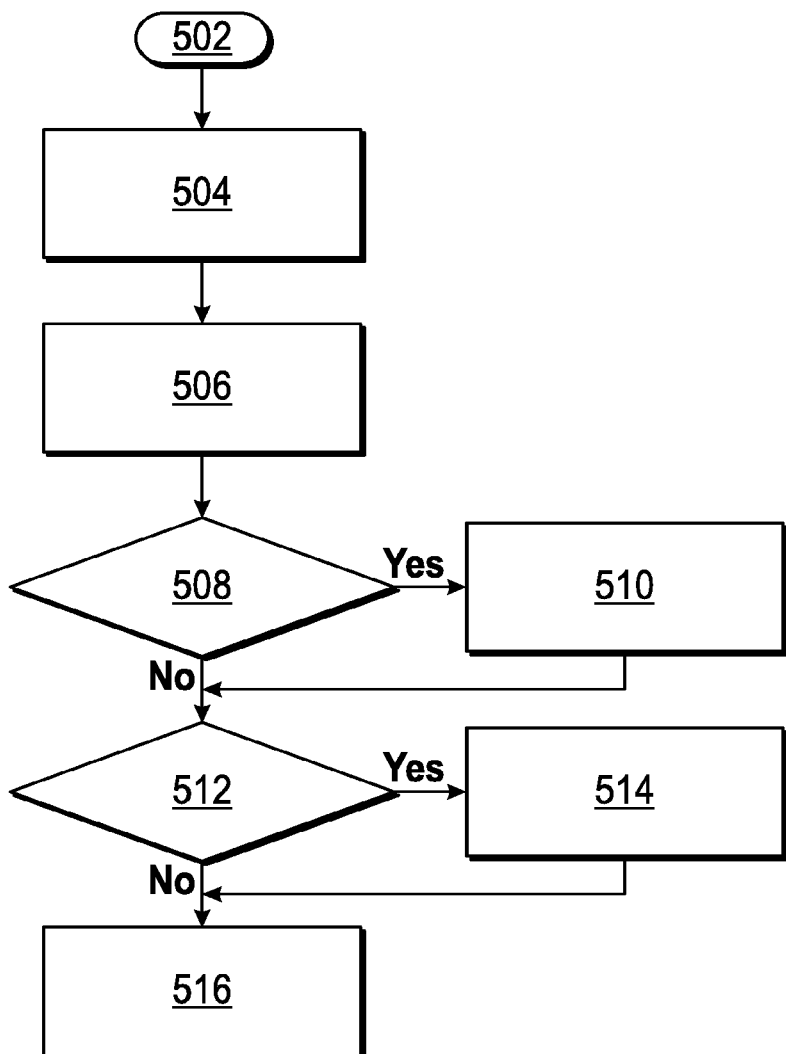
FIG. 5 is a flowchart of major portions of the process flow as performed by a social media networking service member user in viewing and ranking the posted digital media in the present embodiment.

FIG. 5 is a flowchart of major portions of the process flow as performed by a social media networking service member user in viewing and ranking the posted digital media in the present embodiment. If the social media network service requires registration and authentication, the member user registers with the social media network service (502) and creates an account. The member user also registers with the system of the present embodiment, providing registration information including the member user's identification and communications preferences (504). Once registered, the member user is allowed to browse the digital media posted on the social media network service (506). If the member user is interested in the browsed, posted digital media (508), then the member user may indicate approval using the social media network ranking feature (510). If the member user clicks-through the link provided by the posted digital media (i.e., the posted image bundle link) and makes a purchase of the browsed item (512), then the publisher earns credit for the click-through and purchase (514). After the member user ranks the digital media, the system receives notification of the ranking, which allows the system to target marketing regarding the ranked digital media to the member user (516).

Figure 6:
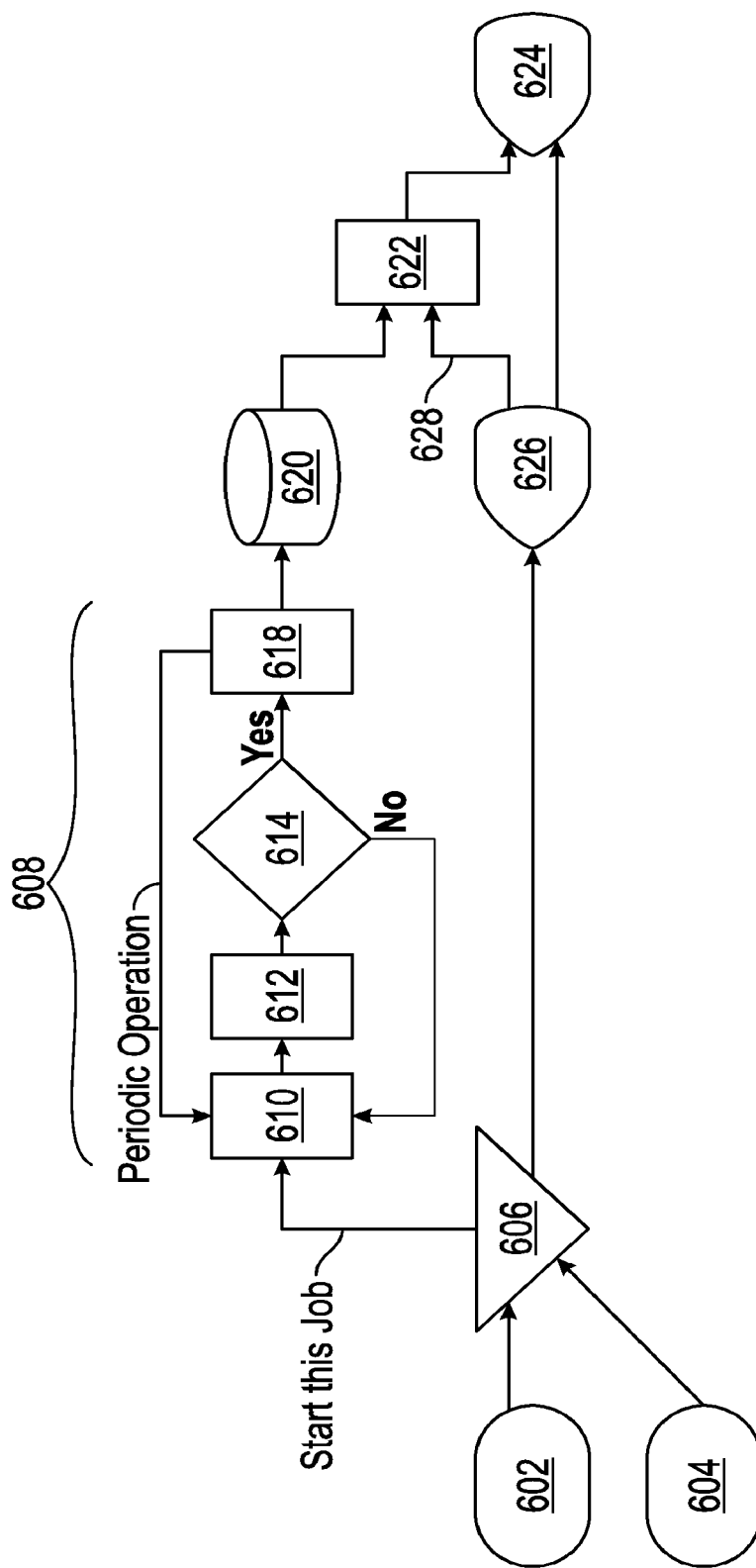
FIG. 6 is a flowchart of major portions of the process flow as performed by an embodiment of the monitoring device.

FIG. 6 is a flowchart of major portions of the process flow as performed by an embodiment of the monitoring device. The monitoring device of the system (608), in general, monitors the social media network service for posted rankings of posted digital media. After registering as a user with the system (602), the registered member user connects to the social media network service using the system user application interface that was installed on the member user's handheld device (604). The application interface authenticates with the social media network service, which provides an access token in response. This access token is shared with the system to allow the system to query the social media network service to obtain the member user's private data. Some social media network services also provide subscription API services that, using this access token, generate notifications whenever the related member user posts or updates data. In this fashion, the system may, using the member user's access token, receive updates whenever the member user makes a post or an update to private data. The present embodiment utilizes the commonly understood OAuth authentication protocol standard, which provides for access tokens. However, other authentication protocol standards that provide the equivalent of the access token may also be utilized and are within the scope of the invention.

Once the member user is authenticated (606), the periodic monitoring engine begins operation by retrieving, using the social media network service API calls, the posted digital media data/metadata and related rankings (for which the member user was responsible) (610) and searching the caption of the retrieved digital media for the information unique identifier (612). If the information unique identifier is present with respect to a particular retrieved digital media data (614), then the retrieved digital media data/metadata and ranking are stored by the system (618) in the data storage device (620) for subsequent processing. This periodic operation (steps 610 through 618) in the present embodiment is performed every five minutes or as often as the API allows, but may be performed on any cycle deemed appropriate for a given member user or social media network service activity load. For example, if a particular member user is known to provide much more frequent postings of digital media rankings, then this period might be reduced to capture the member user's activity in a more expeditious fashion. The converse is the same. Moreover, if the network load on the social media network service is excessively high then the period of operation may be adjusted to improve overall system responsiveness. In any event, the more frequent the engine operates the more current the retrieved data becomes and, therefore, the timelier the targeted marketing becomes.

After connection (606), the member user is presented with a screen on the member user graphical interface (web browser) that includes a view of the member user's rankings and related digital media (626). The member user's interface requests the data (628) and the system responds by returning a listing of the member user's posted rankings and digital media data/metadata (622). This information is then displayed on the member user's interface in a grid, stream, or other view (624). As the member user utilizes the social media network service, the monitoring device refreshes its stored data (620) and this view (624) is updated as often as the API allows, in order to ensure timely information. In one embodiment the member user is presented with a listing of featured publisher user posted digital media to further promote engagement and drive conversions to publishers and retailers related to what the consumer is already engaging with on their social media, effectively targeting marketing related to specific consumer products.

With up-to-date knowledge of the member user's rankings (620), it is possible for the system to target marketing to the member user by this periodic surveying of the member user's rankings. When the system obtains the member user's "current" ranking in the aforementioned fashion, the system can then readily retrieve the relevant ranked digital media and related item data/metadata for timely presentation to the member user through the communications means. In addition to the targeted marketing (as described below), the member user interface view (624) also presents to the member user the relevant ranked digital media and related item data/metadata to assist the member user in purchasing or obtaining the ranked items.

Figure 7:
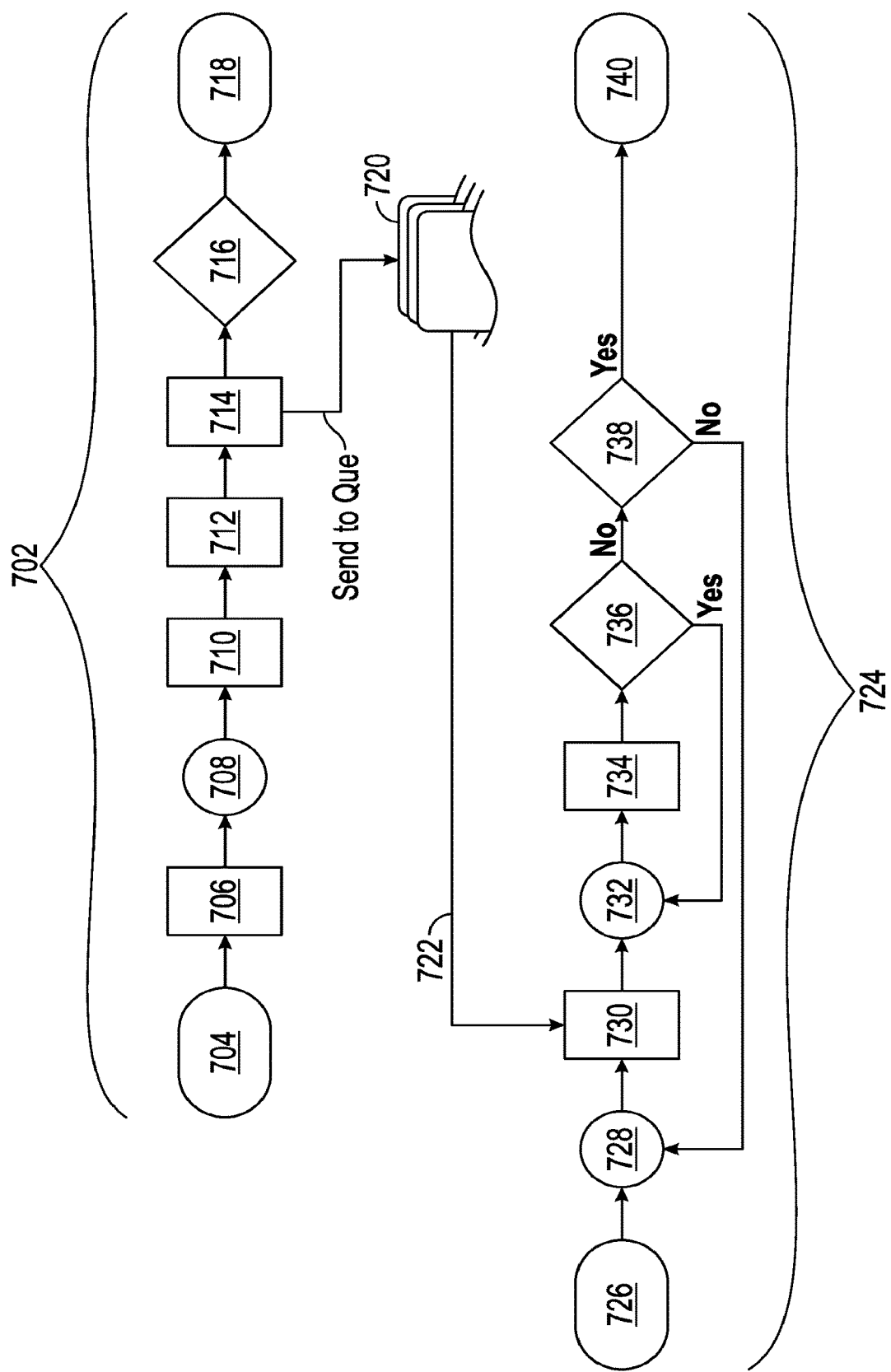
FIG. 7 is a flowchart of major portions of the process flow as performed by an embodiment of the communications device.

FIG. 7 is a flowchart of major portions of the process flow as performed by an embodiment of the communications device. The top half of the diagram presents functions related to the communications queue (702) and the bottom half presents functions related to the processing queue (724). The communications queue (702) and processing queue (724) each run periodically to afford automated communications of the targeted marketing to the member users. It is important to note that the communications device of the present embodiment is adapted to generate, queue, and send email communications with member users. However, in another embodiment the communications device is adapted to generate, queue, and send SMS or MMS text messages to a member user.

The communications queue (702) of the present embodiment is scheduled to run continuously, but may be run periodically, for example, every five minutes (704) followed by a similar period of rest (718). When active, the communications queue obtains from the system a list of active member users for receipt of electronic correspondence (706) containing targeted marketing based on the member user's ranking activities. On a per-user basis (708), the communications queue retrieves the timestamp for the last electronic communication sent to the respective user (710), and then retrieves from the data storage device the information associated with the ten member user rankings posted most recently following the timestamp (712). Separate email correspondence containing the related item data/metadata is then generated based on each of the ten retrieved rankings (714) and the ten generated email correspondences are added to the communications outbox queue (720). Once each of the member user's accounts has been processed (716), the communications queue rests until the period expires (718). The physical creation of an email or other similar electronic correspondence is commonly practiced and understood, and is well within the skill of one having ordinary skill in the art. Although the present embodiment retrieves and processes ten member user rankings, other embodiments may retrieve and process different numbers of member user rankings. For example, another embodiment processes all member user rankings on a given pass through the communications queue, or may process some number less than the stated ten rankings.

Then processing queue (724) of the present embodiment is scheduled to run continuously, but may be run periodically, for example, every five minute period as well (726), followed by a similar period of rest (740). The communications outbox queue (720) is sequentially emptied (730), and each email (732) is sent to the recipient (734) until the queue is emptied (736). If the process has not yet run for the allotted period (738), operation continues (728) and additional emails are obtained from the communications queue (720) for processing (730). If the operational period has expired (738), the processing queue is awakened (728) and the steps repeat. By adapting the queues to run periodically, it is possible to provide timely targeted marketing correspondence without overwhelming the email inbox of the member users. In another embodiment the period of operation/period of rest are dynamic and may be altered depending on desired system responsiveness. The configuration and operation of an email server is commonly practiced and understood, and is well within the skill of one having ordinary skill in the art. Further, other embodiments may use multiple instances of the processing queue (724), each running in a multi-threaded fashion and retrieving items from the communications queue (720) to increase processing efficiency and speed.

Figure 8:
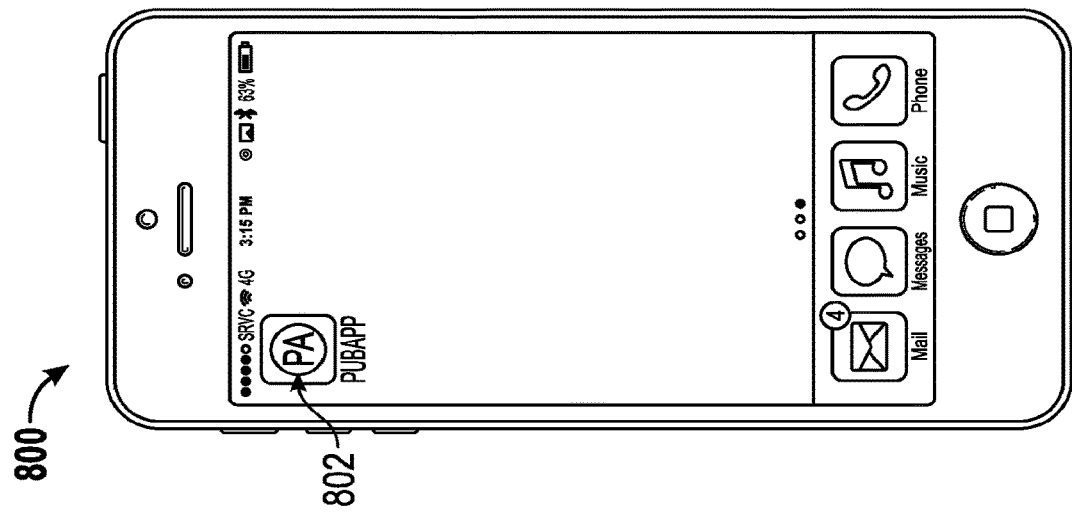
FIG. 8 is a depiction of the screen of a publisher user handheld computing device depicting the application start screen as provided by an embodiment.

FIG. 8 is a depiction of the screen of a publisher user handheld computing device (800) depicting the application start screen as provided by an embodiment. Shown is the start screen of the downloaded handheld computing device application portion of the system. Once downloaded, the application icon (802) appears on the publisher user's screen. Upon selecting the icon to start the application, the publisher user is presented with the system start screen.

Figure 10:
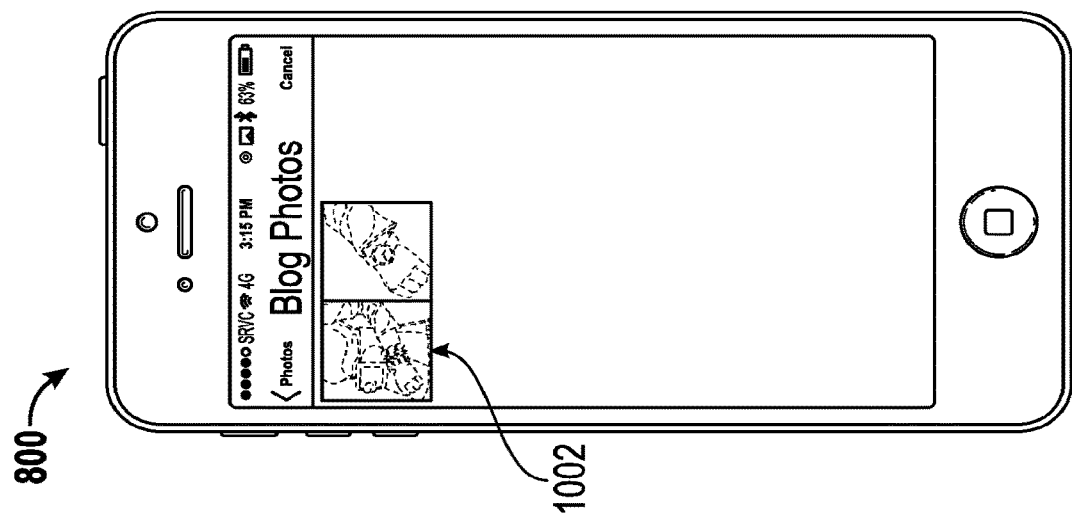
FIG. 10 is a depiction of the screen of a publisher user handheld computing device depicting the media selection screen as provided by the embodiment.
Figure 9:
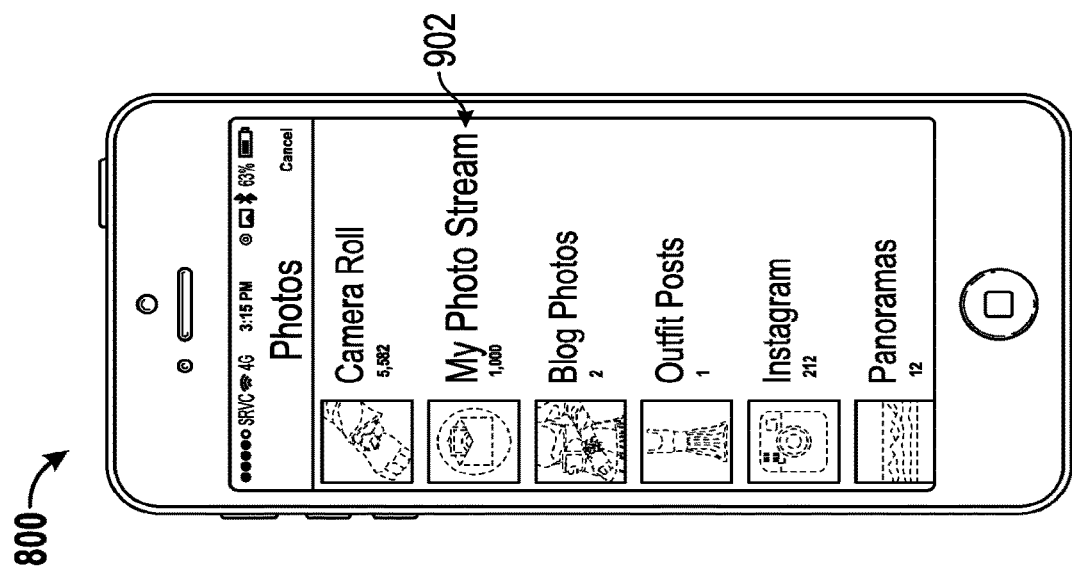
FIG. 9 is a depiction of the screen of a publisher user handheld computing device depicting the media folder screen as provided by the embodiment.
Figures 11, 12, 13:
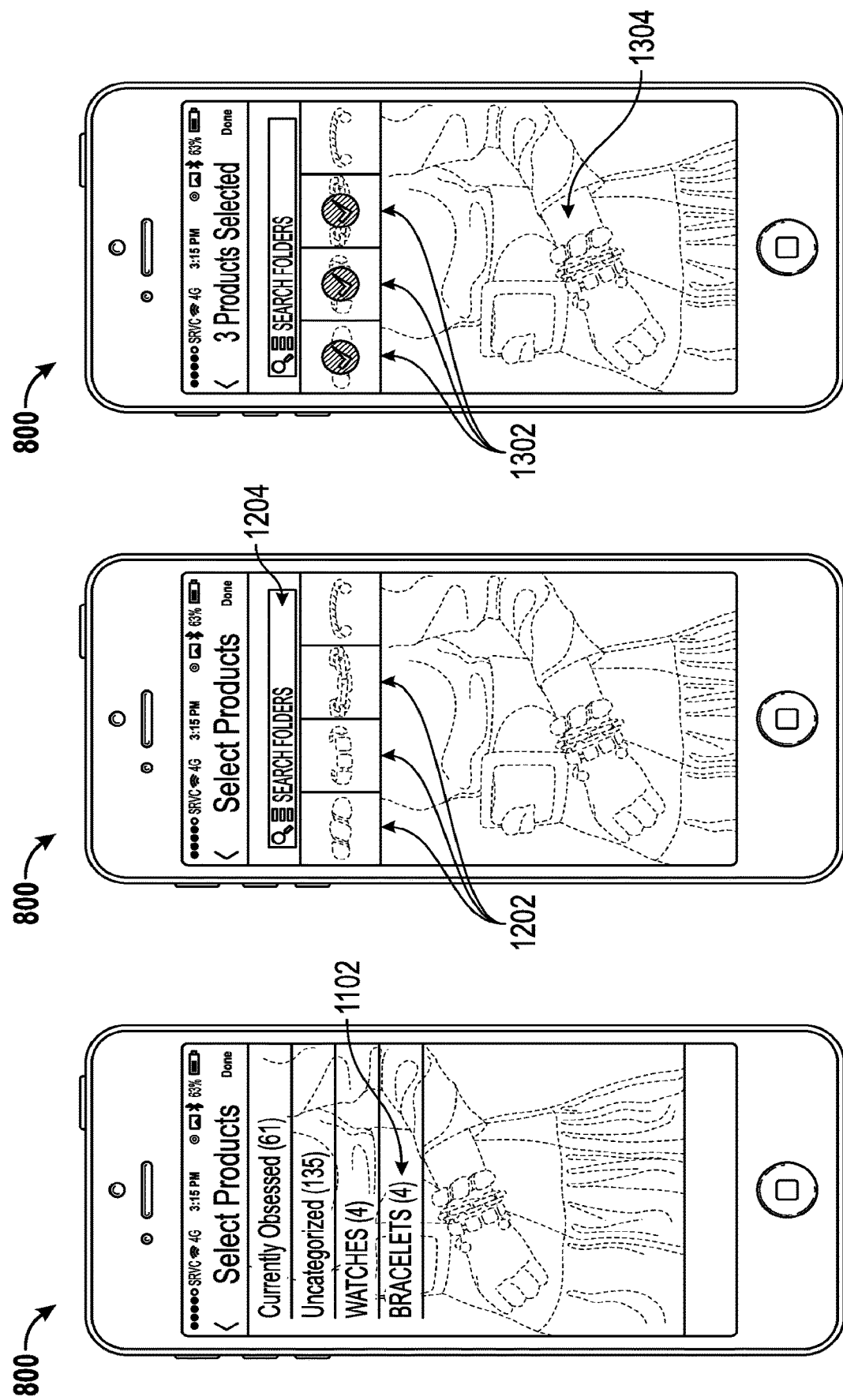
FIG. 11 is a depiction of the screen of a publisher user handheld computing device depicting the favorites folders as provided by the embodiment.
FIG. 12 is a depiction of the screen of a publisher user handheld computing device depicting the products and associated product links available in a particular favorites folder as provided by the embodiment.
FIG. 13 is a depiction of the screen of a publisher user handheld computing device depicting the selected favorites product links as provided by the embodiment.

In accessing the system functionality, the publisher user must first select a digital media file for posting on the social media network service. FIG. 9 is a depiction of the screen of a publisher user handheld computing device (800) depicting the media folder screen as provided by the embodiment. The publisher user is presented with folders from which to select the digital media file for posting (902). Upon selection of a folder, the digital media files are made available. FIG. 10 is a depiction of the screen of a publisher user handheld computing device depicting the media selection screen as provided by the embodiment. The publisher user selects a digital media file for use (1002). Once selected, the publisher user is presented with his or her favorites folders as maintained by the system. FIG. 11 is a depiction of the screen of a publisher user handheld computing device depicting the favorites folders as provided by the embodiment. As stated above, the favorites folders in this embodiment contain favored consumer product image data/metadata and links to sources of various consumer items of interest to the publisher user. The publisher user selects a favorites folder (1102) containing consumer items visible in the selected digital media file, and is presented with a display of the favored consumer products stored therein as depicted in FIG. 12.

FIG. 12 is a depiction of the screen of a publisher user handheld computing device (800) depicting the product links available in a particular favorites folder as provided by the embodiment. Shown in the figure are favored consumer products retained by the system in the publisher user's selected favorites folder (1202). Publisher users also have the ability to search the contents of the folder (1204) in the event of a large number of stored items, or of the system database for other such saved consumer product image data/metadata. FIG. 13 is a depiction of the screen of a publisher user handheld computing device depicting the selected favorites consumer product links as provided by the embodiment. Depicted are the selected products (1302) in the folder that the publisher user wishes to highlight in the chosen digital media file (1304). In this case, the digital media is a photographic image of a female's wrist with stacking bracelets (1304). The images from the favorites folder that were chosen (1302) are the bracelets in the image (1304).

Figure 14:
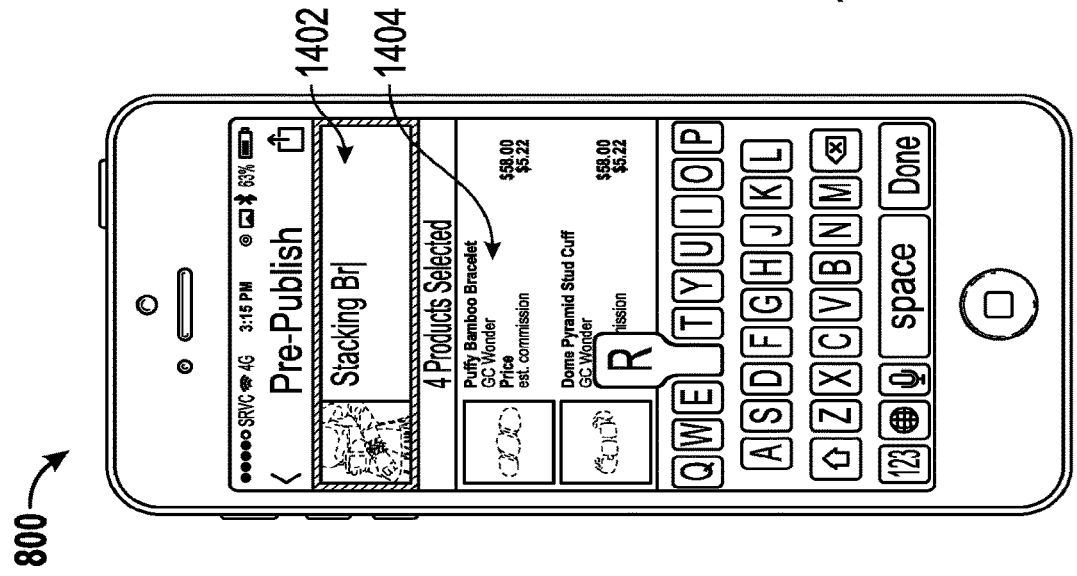
FIG. 14 is a depiction of the screen of a publisher user handheld computing device depicting the entry of a caption for the selected media and appended unique identifier as provided by the embodiment.

FIG. 14 is a depiction of the screen of a publisher user handheld computing device (800) depicting the entry of a caption for the selected media and appended unique identifier as provided by the embodiment. After selecting the items from the favorites folder or from the results of a search of the system database, the publisher user is presented with a screen for entry of a caption to accompany the digital media file (1402), preferably a description of the image contents. Below the caption entry is a listing of the selected items, including item metadata (for example, purchase price, commission amounts, source for item, etc.).

Figure 15:
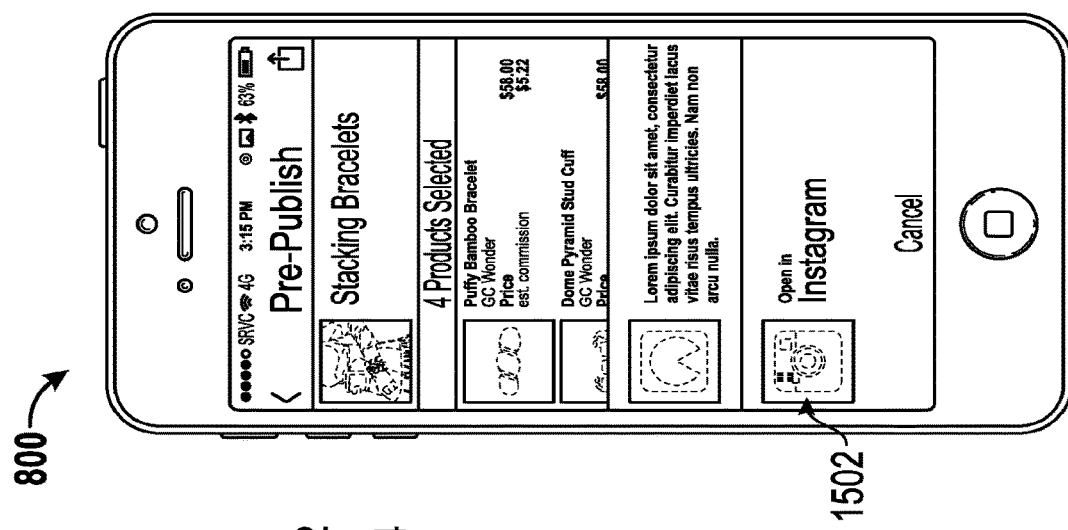
FIG. 15 is a depiction of the screen of a publisher user handheld computing device depicting the social media network publication selection screen as provided by the embodiment.

Following selection of items and entry of a caption, the publisher user is presented with the pre-publication screen for publication to the social media network service. FIG. 15 is a depiction of the screen of a publisher user handheld computing device (800) depicting the social media network publication selection screen as provided by the embodiment. In this instance, the digital media and data are intended for publication on the Instagram social media network service, which may be accomplished by selecting the Instagram icon (1502). It is also possible for the publisher user to copy the information unique identifier that is presented to a web browser clipboard or text editor, and paste the copied information unique identifier as a caption or comment manually in a social media posting.

Figure 16:
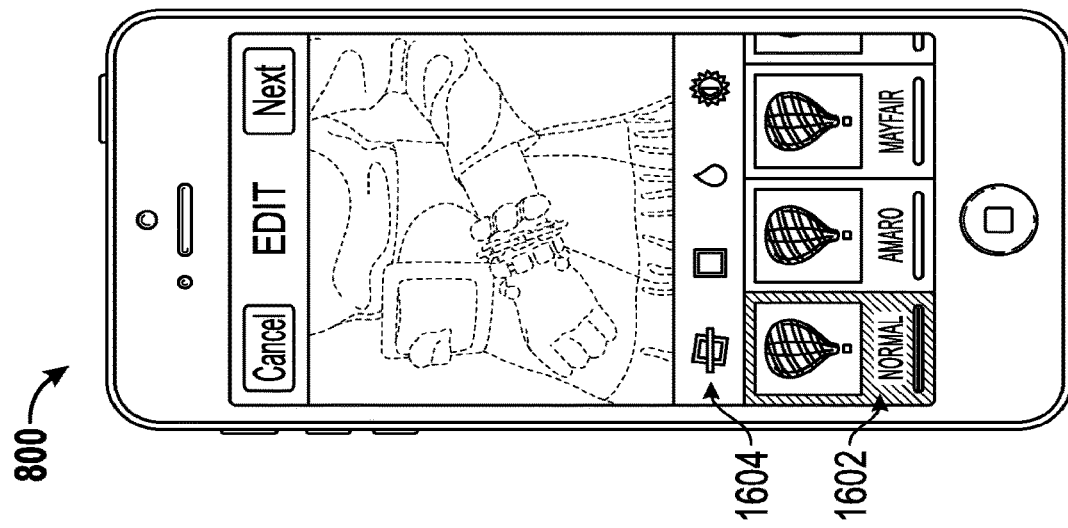
FIG. 16 is a depiction of the screen of a publisher user handheld computing device depicting the social media network media editing screen and options as provided by the embodiment.

Upon selection of the Instagram social media network service icon (1502), the publisher user interface changes to the social media network service image modification screen. FIG. 16 is a depiction of the screen of a publisher user handheld computing device (800) depicting the social media network media editing screen and options as provided by the embodiment. As shown, the publisher user is provided with numerous filters (1602) that may be applied to the digital media image, including rotation, brightness, and contrast adjustments (1604). Once the digital media image is adjusted, if desired, the image is ready for posting on the social media network website.

FIG. 17 is a depiction of the screen of a publisher user handheld computing device depicting the social media network media sharing screen as provided by the embodiment. This screen presents the publisher user with the ability to edit the digital media file metadata (1702) and to post the posted image on a selection of other social media network services (1704). Once formally published, the publisher user is presented with the posted digital media file as it appears on the social media network service website as in FIG. 18. FIG. 18 is a depiction of the screen of a publisher user handheld computing device depicting the social media network publisher shared media as provided by the embodiment. Visible on this screen is the posted digital media file (1802), the caption (1804) containing the information unique identifier elements (1806), and the ranking feature (1808). The digital media file is now formally posted on the social median network service website and the system is notified and the information unique identifier is activated by the system.

FIG. 19 is a depiction of the screen of a social media member user handheld computing device (1900) depicting the social media network screen for member user review and ranking as provided by the embodiment. In this example, the digital media file image (1902) is presented as posted, with the caption containing the information bundle presented below (1904). The member user is given the option to rank the image by selecting the "like" button (1906), and/or may add a comment (1908) to the post. In another embodiment the posted comment is retrieved by the system in the same fashion as the ranking, and is utilized alone or in conjunction with the ranking to further refine the targeting of marketing information to the member user. Upon selection of the "@SMAccountThirdElement" element of the information bundle (1910), the user is presented with the social media network service system account screen as depicted in FIG. 20.

Figure 22:
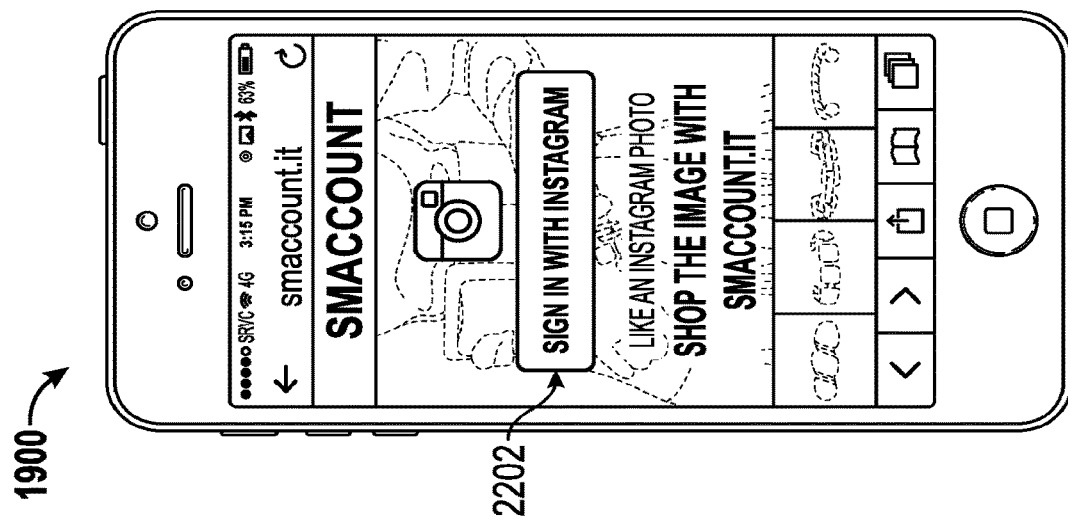
FIG. 22 is a depiction of the screen of a social media member user handheld computing device depicting the system website as provided by the embodiment.
Figure 21:
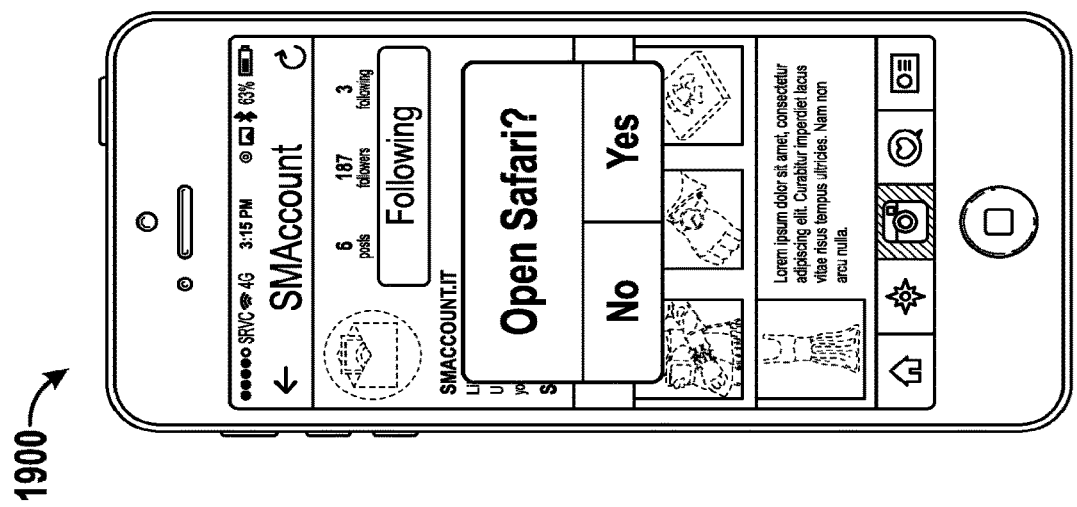
FIG. 21 is a depiction of the screen of a social media member user handheld computing device depicting the social media network screen in response to selection of the system website hyperlink as provided by the embodiment.
Figure 20:
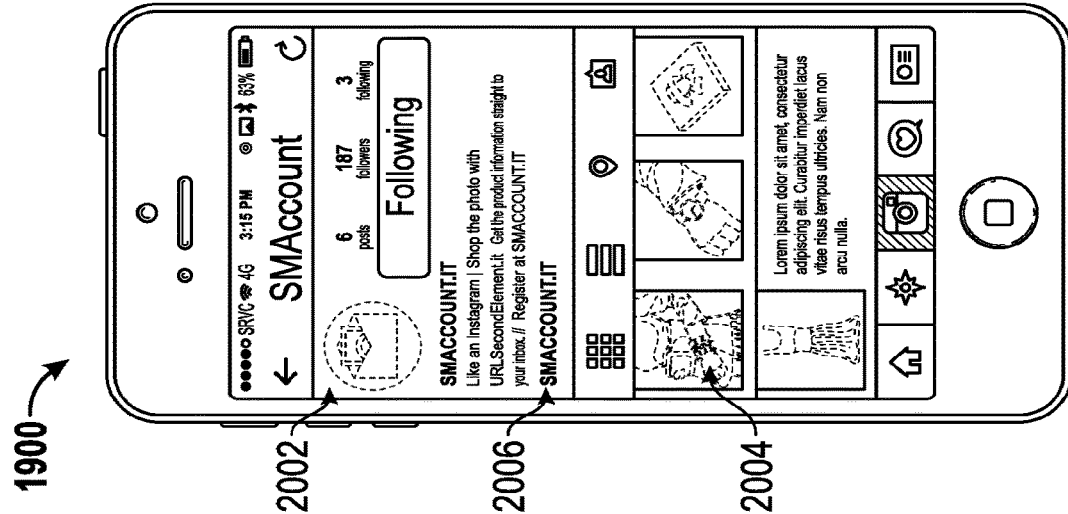
FIG. 20 is a depiction of the screen of a social media member user handheld computing device depicting the social media network media screen with the posted digital media file shown as provided by the embodiment.
Figure 23:
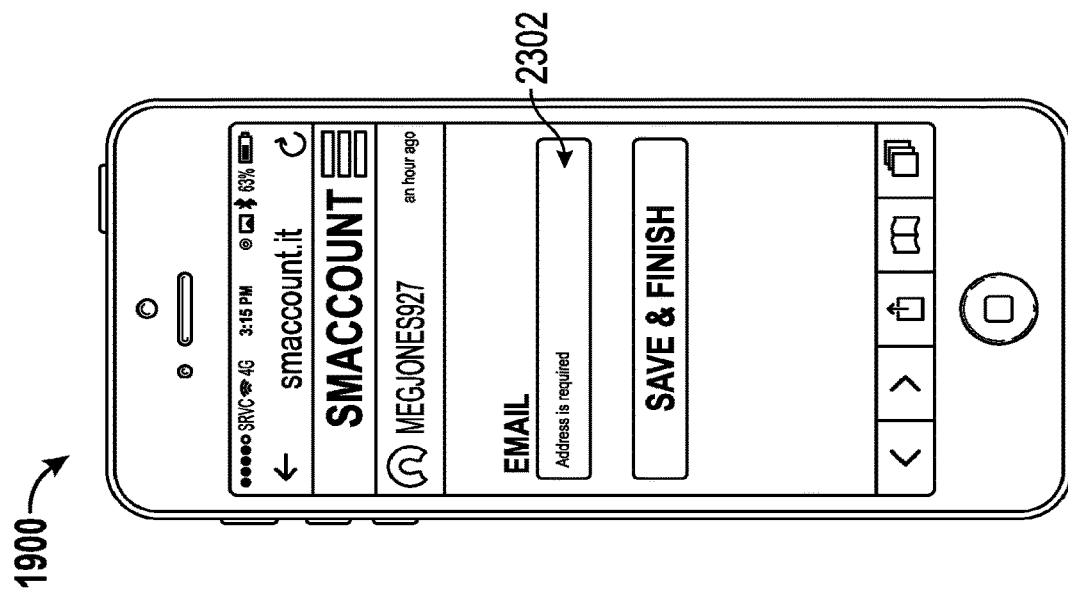
FIG. 23 is a depiction of the screen of a social media member user handheld computing device depicting the system website member user login as provided by the embodiment.

FIG. 20 is a depiction of the screen of a social media member user handheld computing device (2000) depicting the social media network media screen associated with the posted digital media file shown as provided by the embodiment. This screen presents the member user with information related to the system services (2002), as well as the system associated digital media files that the embodied system presents for promotional purposes (2004). Upon selection of a hyperlink representing the system services (2006), the member user is redirected to a web browser as shown in FIG. 21, from where the system services may be accessed directly as shown in FIG. 22. FIG. 21 is a depiction of the screen of a social media member user handheld computing device (1900) depicting the social media network screen in response to selection of the system website hyperlink as provided by the embodiment. FIG. 22 is a depiction of the screen of a social media member user handheld computing device (1900) depicting the system website as provided by the embodiment. By registering with the system website, the member user may sign into the system service (2202) and provide communications preferences as shown in FIG. 23. FIG. 23 is a depiction of the screen of a social media member user handheld computing device (1900) screen depicting the system website member user registration as provided by the embodiment. In this instance the member user is allowed to enter a preferred email address (2302) for receipt of the targeted marketing correspondence.

Figure 24:
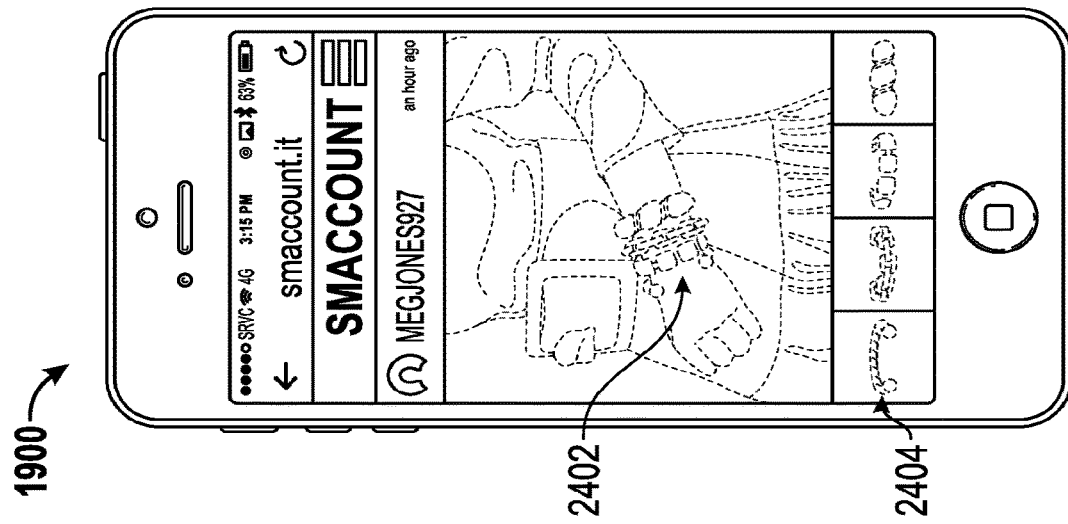
FIG. 24 is a depiction of the screen of a social media member user handheld computing device depicting the selected media on the system website as provided by the embodiment.

FIG. 24 is a depiction of the screen of a social media member user handheld computing device (1900) depicting the selected media on the system website as provided by the embodiment. Depicted is the screen that is displayed following member user sign in. From this screen the user is presented with a view of the ranked social media network service posted digital media (2402) along with a view of the related item data originally highlighted by the respective publisher user. In this instance the separate bracelets are displayed (2404) that comprise the stacked bracelets (2402). This screen is a representation of the targeted marketing correspondence that the member user receives, which was generated in response to the member user's ranking activity as described above. This targeted marketing is also presented to the member user in a crafted email correspondence as depicted in FIG. 25.

Figure 25:
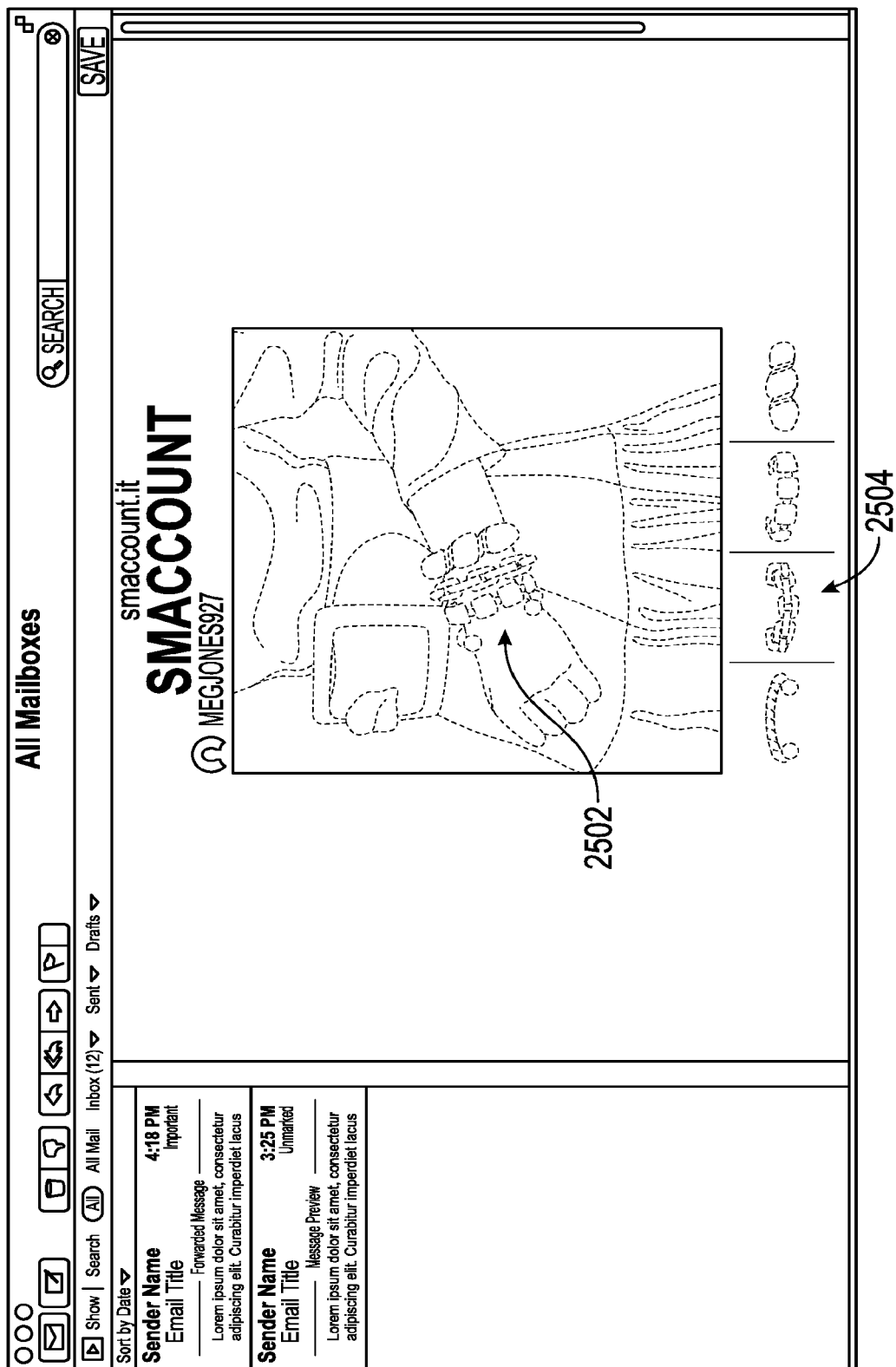
FIG. 25 is a depiction of the screen of a social media member user email reader depicting the targeted marketing email communication as provided by the embodiment.
Figure 26:
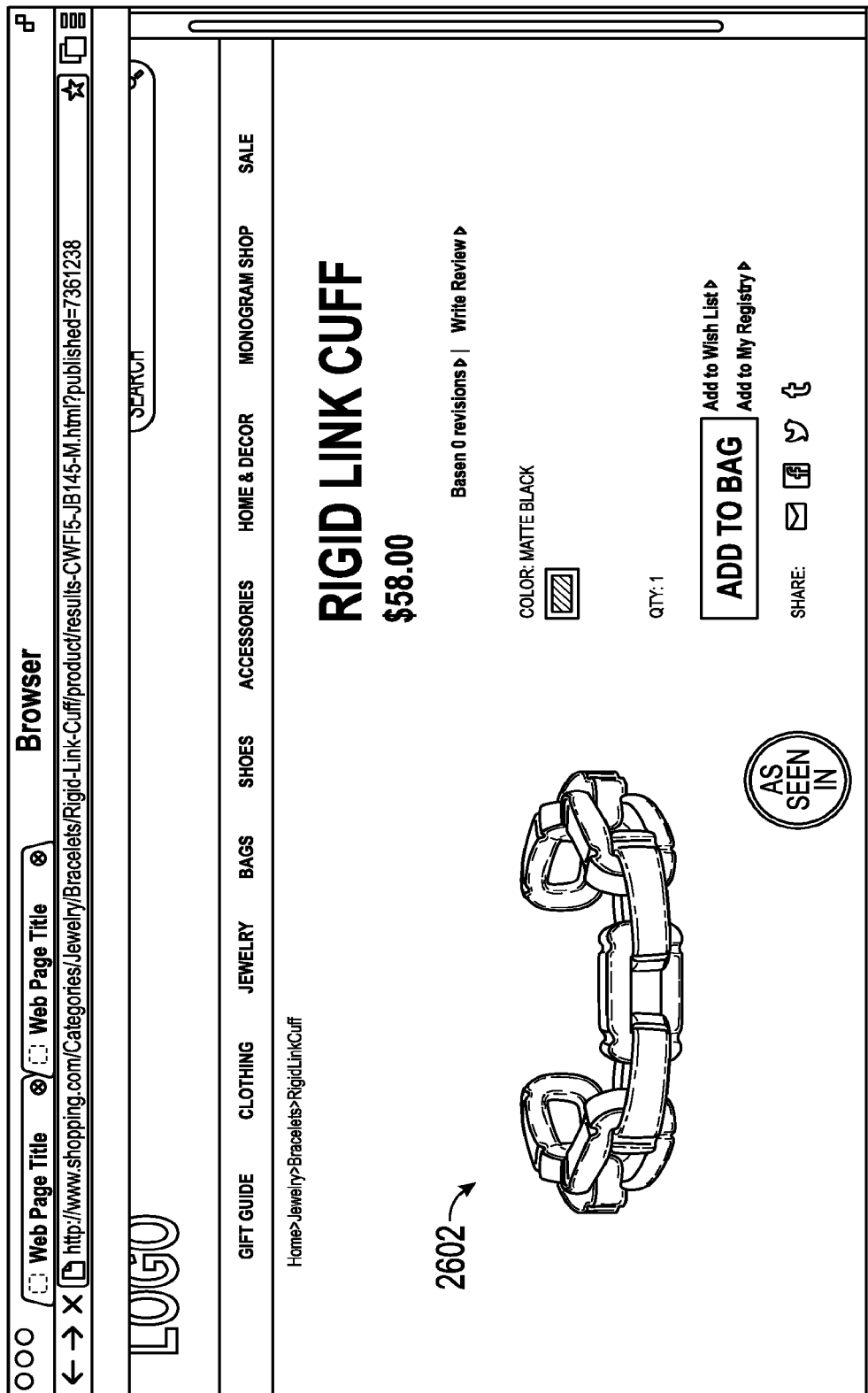
FIG. 26 is a depiction of the screen of a social media member user web browser depicting an item of interest as obtained from a link in the email communication or the system website as provided by the embodiment.

FIG. 25 is a depiction of the screen of a social media member user email client depicting the targeted marketing email communication as provided by the embodiment. Visible on this screen is the member user email client, which may be any common web or desktop email client (for example, Mac Mail, Outlook, Thunderbird, Gmail, etc.). Visible within the reading pane of the email client is the targeted marketing correspondence, which in this case is the stacked bracelet image (2502) and related item data (2504). The related item data (2504) is a hyperlink that causes a web browser to open and display information regarding the related item selected. For example, selecting the bracelet (2504) causes the member user's computing device to open a web browser as depicted in FIG. 26. FIG. 26 is a depiction of the screen of a social media member user web browser depicting an item of interest as obtained from a link in the email communication or the system website as provided by the embodiment. Shown is the related item (bracelet) and associated purchasing information (2602) for facilitating a purchase of the item by the member user. By providing such timely targeted marketing and direct access to the consumer item information for the member user, the possibility of consummating a sale is greatly improved.

As indicated above, aspects of this invention pertain to specific "method functions" implementable through various computer systems. In an alternate embodiment, the invention may be implemented as a computer program product for use with a computer system. Those skilled in the art should readily appreciate that programs defining the functions of the present invention can be delivered to a computer in many forms, which include, but are not limited to: (a) information permanently stored on non-writeable storage media (e.g. read only memory devices within a computer such as ROMs or CD-ROM disks readable only by a computer I/O attachment); (b) information alterably stored on writeable storage media (e.g. floppy disks and hard drives); or (c) information conveyed to a computer through communication media, such as a local area network, a telephone network, or a public network like the Internet. It should be understood, therefore, that such media, when carrying computer readable instructions that direct the method functions of the present invention, represent alternate embodiments of the present invention.

The invention may be embodied in other specific forms without departing from the spirit or essential characteristics thereof. The present embodiments are therefore to be considered in all respects as illustrative and not restrictive. Accordingly, the scope of the invention is established by the appended claims rather than by the foregoing description. All changes which come within the meaning and range of equivalency of the claims are therefore intended to be embraced therein. Further, the recitation of method steps does not denote a particular sequence for execution of the steps. Such method steps may therefore be performed in a sequence other than that recited unless the particular claim expressly states otherwise. Moreover, multiple computer automated devices may be combined to achieve all or a portion of the stated functionality.

We claim:

1. A system for targeted information dissemination based on network interaction, the system comprising:
   at least one processor in communication with a memory storing a plurality of database records, the at least one processor in network communication with (i) a network service computing device associated with a network service and (ii) a publisher computing device associated with a publisher, the at least one processor configured to:
   receive a selection of digital media data and related digital media data from the publisher computing device;
   store the digital media data and the related digital media data in a digital media database record in a data storage device, the storing including creating and storing a record identifier;
   produce a hash value corresponding to the record identifier by encoding the record identifier;
   generate an information unique identifier, the information unique identifier including a first element, a second element based on the hash value, and a third element;
   display, via a user interface, the digital media data, the related digital media data, and the information unique identifier for posting on the network service, wherein the user interface transitions to the network service for posting of the digital media data and the related digital media data on the network service;
   receive a generated callback from the network service, wherein the generated callback is generated in response to posting the digital media data, the related digital media data, and the information unique identifier on the network service; and
   in response to receiving the generated callback, activate the information unique identifier and saving posted digital data and related posted digital media data in the data storage device.

2. The system of claim 1, the at least one processor further configured to:
   receive modified digital media data, the modified digital media data corresponding to the digital media data that had a filter applied before posting on the network service; and
   in response to the receiving, save the modified digital media data in the data storage device.

3. The system of claim 1, wherein the receiving the selection of the related digital media data includes:
   conducting a search for at least one hyperlink and corresponding metadata relating to an item in the digital media data.

4. The system of claim 1, wherein the first element includes a network hash tag linking a plurality of information unique identifiers on the network service.

5. The system of claim 4, the at least one processor further configured to:
   search the network service for the first element, the searching returning a plurality of network posts that include the first element.

6. The system of claim 1, wherein the second element includes a shortened hyperlink for displaying the digital media database record corresponding to the hash value.

7. The system of claim 1, wherein the third element corresponds to a master account handle of the network service.

8. The system of claim 1, the at least one processor further configured to:
   update, based on feedback via the user interface, the digital media database record.

9. A computer-implemented method for targeted information dissemination based on network interaction, the method implemented using at least one processor in communication with a memory storing a plurality of database records, the at least one processor in network communication with (i) a network service computing device associated with a network service and (ii) a publisher computing device associated with a publisher, the method comprising:
   receiving a selection of digital media data and related digital media data from the publisher computing device;
   storing the digital media data and the related digital media data in a digital media database record in a data storage device, the storing including creating and storing a record identifier;
   producing a hash value corresponding to the record identifier by encoding the record identifier;
   generating an information unique identifier, the information unique identifier including a first element, a second element based on the hash value, and a third element;
   displaying, via a user interface, the digital media data, the related digital media data, and the information unique identifier for posting on the network service, wherein the user interface transitions to the network service for posting of the digital media data and the related digital media data on the network service;

receiving a generated callback from the network service, wherein the generated callback is generated in response to posting the digital media data, the related digital media data, and the information unique identifier on the network service; and in response to receiving the generated callback, activating the information unique identifier and saving posted digital data and related posted digital media data in the data storage device.

10. The computer-implemented method of claim 9, further comprising:

receiving modified digital media data, the modified digital media data corresponding to the digital media data that had a filter applied before posting on the network service; and in response to the receiving, saving the modified digital media data in the data storage device.

11. The computer-implemented method of claim 10, wherein the third element corresponds to a master account handle of the network service.

12. The computer-implemented method of claim 9, wherein the receiving the selection of the related digital media data includes:

conducting a search for at least one hyperlink and corresponding metadata relating to an item in the digital media data.

13. The computer-implemented method of claim 9, wherein the first element includes a network hash tag linking a plurality of information unique identifiers on the network service.

14. The computer-implemented method of claim 13, further comprising:

searching the network service for the first element, the searching returning a plurality of network posts that include the first element.

15. The computer-implemented method of claim 9, wherein the second element includes a shortened hyperlink for displaying the digital media database record corresponding to the hash value.

16. The computer-implemented method of claim 9, further comprising:

updating, based on feedback via the user interface, the digital media database record.

17. A non-transitory computer-readable medium storing computer-executable instructions which, when executed by at least one processor in communication with a memory storing a plurality of database records, the at least one processor in network communication with (i) a network service computing device associated with a network service and (ii) a publisher computing device associated with a publisher, cause the at least one processor to perform operations for targeted information dissemination based on network interaction, the operations comprising:

receiving a selection of digital media data and related digital media data from the publisher computing device;

storing the digital media data and the related digital media data in a digital media database record in a data storage device, the storing including creating and storing a record identifier;

producing a hash value corresponding to the record identifier by encoding the record identifier;

generating an information unique identifier, the information unique identifier including a first element, a second element based on the hash value, and a third element;

displaying, via a user interface, the digital media data, the related digital media data, and the information unique identifier for posting on the network service, wherein the user interface transitions to the network service for posting of the digital media data and the related digital media data on the network service;

receiving a generated callback from the network service, wherein the generated callback is generated in response to posting the digital media data, the related digital media data, and the information unique identifier on the network service; and in response to receiving the generated callback, activating the information unique identifier and saving posted digital data and related posted digital media data in the data storage device.

18. The non-transitory computer-readable medium of claim 17, wherein the first element includes a network hash tag linking a plurality of various information unique identifiers on the network service.

19. The non-transitory computer-readable medium of claim 17, wherein the second element includes a shortened hyperlink for displaying the digital media database record corresponding to the hash value.

20. The non-transitory computer-readable medium of claim 17, wherein the third element corresponds to a master account handle of the network service.

* * * * *